United States Patent [19]
Chandrasekhar

[11] Patent Number: 5,995,273
[45] Date of Patent: Nov. 30, 1999

[54] ELECTROCHROMIC DISPLAY DEVICE

[75] Inventor: Prasanna Chandrasekhar, Freehold, N.J.

[73] Assignee: Ashwin-Ushas Corporation, Freehold, N.J.

[21] Appl. No.: 09/030,170

[22] Filed: Feb. 25, 1998

[51] Int. Cl.⁶ .............................. G02F 1/15; G02B 1/04
[52] U.S. Cl. ................. 359/270; 359/265; 359/267; 359/269; 359/273; 252/62.2; 252/582; 252/583
[58] Field of Search .................... 359/265, 267, 359/269, 270, 273; 252/62.2, 583, 582, 586

[56] References Cited

U.S. PATENT DOCUMENTS

| | | | |
|---|---|---|---|
| 3,807,832 | 4/1974 | Castellion | 350/160 R |
| 3,844,636 | 10/1974 | Maricle et al. | 350/160 |
| 4,215,917 | 8/1980 | Giglia et al. | 359/272 |
| 4,272,163 | 6/1981 | Smokhin et al. | 359/265 |
| 4,304,465 | 12/1981 | Diaz | 359/272 |
| 4,586,792 | 5/1986 | Yang et al. | 350/357 |
| 4,749,260 | 6/1988 | Yang et al. | 350/357 |
| 5,079,334 | 1/1992 | Epstein et al. | 528/210 |
| 5,124,080 | 6/1992 | Shabrang et al. | 252/583 |
| 5,137,991 | 8/1992 | Epstein et al. | 525/540 |
| 5,159,031 | 10/1992 | Epstein et al. | 525/540 |
| 5,164,465 | 11/1992 | Epstein et al. | 525/540 |
| 5,241,411 | 8/1993 | Arribart et al. | 359/269 |
| 5,253,100 | 10/1993 | Yang et al. | 359/266 |
| 5,413,739 | 5/1995 | Coleman | 252/511 |
| 5,446,576 | 8/1995 | Lynam et al. | 359/267 |
| 5,446,577 | 8/1995 | Bennett et al. | 359/273 |
| 5,500,759 | 3/1996 | Coleman | 359/270 |
| 5,561,206 | 10/1996 | Yamamoto et al. | 526/256 |

OTHER PUBLICATIONS

P. Chandrasekhar, et al., The International Society for Optical Engineering, 2528:169–180 (1995).
A. Masulaitis, et al., The International Society for Optical Engineering, 2528:190–197 (1995).

*Primary Examiner*—Georgia Epps
*Assistant Examiner*—Margaret Burke
*Attorney, Agent, or Firm*—Seidel, Gonda, Lavorgna & Monaco, PC

[57] ABSTRACT

An electrochromic device is provided having an electrochromic conducting polymer layer in contact with a flexible outer layer. A conductive reflective layer is disposed between the electrochromic conducting polymer and a substrate layer. A liquid or solid electrolyte contacts the conductive reflective layer and a counter electrode in the device. A liquid electrolyte may comprise, for example, a mixture of sulfuric acid, poly(vinyl sulfate), and poly(anethosulfonate). A solid electrolyte may comprise, for example, a mixture of sulfuric acid, poly(vinyl sulfate), poly(anethosulfonate), and poly(vinyl alcohol). The electrochromic conducting polymer layer may comprise, for example, poly(diphenyl amine), poly(4-amino biphenyl), poly(aniline), poly(3-alkyl thiophene), poly(phenylene), poly(phenylene vinylene), poly(alkylene vinylenes), poly(amino quinolines), or poly (diphenyl benzidine) and one or more dopants such as poly(styrene sulfonate), poly(anethosulfonate), poly(vinyl sulfate), p-toluene sulfonate, trifluoromethane sulfonate, and poly(vinyl stearate).

21 Claims, 37 Drawing Sheets

સ,995,273

ELECTROCHROMIC DISPLAY DEVICE

FIELD OF THE INVENTION

The invention relates to conducting polymer compositions and electrochromic devices containing the same. More particularly, the invention relates to conducting polymer compositions and electrochromic devices which are responsive in a broad spectral region.

BACKGROUND OF THE INVENTION

Electrochromic materials change color upon application of a voltage. Electrochromic devices are commonly used in windows, rear view automobile mirrors, and flat panel displays.

The change in color of an electrochromic material is usually due to an oxidation/reduction ("redox") process within the electrochromic material. Most electrochromic devices are responsive in the visible light region. Electrochromic materials active in the visible spectral region include metal oxides, such as $WO_3$, $MoO_3$ and nickel oxides. Metal oxides typically range in color from highly colored, such as dark blue, to transparent.

Conducting polymers are a new class of electrochromic materials which have recently received attention. Oxidation or reduction of a conducting polymer, which changes its color and conductivity, is usually accompanied by an inflow or outflow of counterions in the conducting polymer known as "dopants". Common dopant counterions include $ClO_4^-$ and $BF_4^-$. For example, the conducting polymer poly (pyrrole) is dark blue and conductive in its oxidized state ("doped state"). In its reduced state ("de-doped state"), poly(pyrrole) is pale green and non-conductive. Similarly, poly(aniline) is nearly transparent in its reduced state. When oxidized with dopants, such as $Cl^-$ and $SO_4^{2-}$, poly(aniline) becomes dark green. During doping of a conducting polymer, the conducting polymer swells due to the absorption of solvated counterions and solvent.

Few electrochromic materials are capable of modulating infrared light, i.e., altering the wavelength and intensity of light in the infrared region. In fact, most electrochromic materials capable of any change in the infrared region are static electrochromics, i.e., materials which cannot be switched between different reflective states. Conducting polymers are known to exhibit electrochromism in the visible and infrared regions. Current electrochromic devices which modulate light in the infrared region are radiators rather than modulators.

There are two types of electrochromic devices—transmissive mode devices and reflective mode devices. In transmissive mode electrochromic devices, light passes through the device. The incident light is modulated as it passes through the device. In contrast, reflective mode electrochromic devices reflect incident light. The incident light traverses the device before being reflected. As the incident light and reflected light traverses the device, the light is modulated.

An important characteristic of an electrochromic device is its "dynamic range". The dynamic range of an electrochromic device is the difference in percent reflectance between the extreme electrochromic states of the electrochromic material at a given wavelength. Other important properties of an electrochromic device are multicolor capability, broad band response, switching time and cyclability. Cyclability is the number of times the color of an electrochromic device may be changed before significant degradation of the working electrode occurs.

There is a need for flexible flat panel displays of variable area for use as camouflage for military vehicles and personnel. In particular, the displays need to be capable of multispectral and tailorable operation in the visible through near infrared to long wave infrared regions, approximately 0.35 to 24 μm. There is a special interest in devices capable of operating in the long wave infrared region beyond 8 μm. The displays need to be thin and able to draped over objects of varying shapes and sizes.

An example of an electrochromic device which incorporates a conducting polymer is U.S. Pat. No. 5,253,100, issued to Yang ("the Yang patent"). The Yang patent discloses an electrochromic device containing two layers of poly(aniline) as the electrochromic material. The first layer is preferably poly(aniline)/poly(styrene sulfonate) (PSS$^-$) or poly(aniline)/acrylate obtained by electrochemical polymerization of poly(aniline) in poly(styrene sulfonate) (PSS) or poly(acrylic acid). The second (less dense) layer is prepared by chemical polymerization of aniline monomer in a template of acrylic acid or HPSS to yield a processible composite which can be coated. The device further contains solid electrolyte. The solid electrolyte includes typical solid electrolyte components such as poly(vinyl sulfonate), poly (styrene sulfonate), poly(acrylic acid, salt) (PAA), poly(-2-acrylamido-2-methyl propane sulfonic acid) and poly (phosphazenes).

The device of the Yang patent has a sandwich structure which preferably comprises the following layers in the order recited: glass, indium tin oxide (ITO), solid electrolyte, second layer of poly(aniline), first layer of poly(aniline), ITO, and glass. The solid electrolyte is in contact with the second layer of poly(aniline). The second poly(aniline) layer is said to aid solid electrolyte penetration and contact with the first poly(aniline) layer. Yang discloses that the combination of the solid electrolyte and the two layers of poly (aniline) increases the efficiency of the device.

The Yang device is inflexible due to the glass outer layers. The glass outer layer can not be substituted with poly (ethylene), since ITO and all other transparent conductors cannot be deposited on poly(ethylene) without cracking. If the first ITO layer were replaced by a thin metal layer, such as gold, there would be a trade off of thickness versus opacity. The gold layer at a thickness required for efficient device operation would be substantially opaque. Furthermore, the layers of glass, ITO, and electrolyte are opaque to infrared light; the electrochromic material of the Yang device is not responsive in the infrared region.

Maricle et al., U.S. Pat. No. 3,844,636, discloses a reflective mode electrochromic mirror utilizing $WO_3$ as the electrochromic material. The electrochromic material is sandwiched between a glass front layer and an ion porous layer. The ion porous layer is composed of a conductive reflective material. An electrolyte layer is adjacent the ion porous layer. A counter electrode layer is adjacent the electrolyte layer, such that the electrolyte layer separates the ion porous layer from the counter electrode layer. The electrochromic material, $WO_3$, is infrared opaque and incapable of infrared modulation. The mirror is inflexible due to the glass front layer. Flexibility cannot be achieved by substituting plastics for the glass, since $WO_3$ is incohesive, cracks, and peels on flexible substrates.

Castellion, U.S. Pat. No. 3,807,832, discloses a reflective mode electrochromic mirror. The electrochromic material may be a metal oxide such as $WO_3$ or $MoO_3$. The electrochromic material is sandwiched between a transparent conductive electrode and a layer of electrolyte. A porous reflective layer is disposed in the electrolyte. A counter electrode is in contact with the electrolyte. The electrochromic materials, metal oxides such as $WO_3$ and $MoO_3$, are opaque in the infrared region and incapable of modulation of light in the infrared region. The mirror is inflexible since the electrochromic material and the transparent conductive electrode are composed of materials which are inflexible.

Bennett et al., U.S. Pat. No. 5,446,577, ("the Bennett et al. patent") discloses a reflective mode electrochromic display comprising the following layers in the order recited: first transparent layer, electrolyte, electrochromic material, metallized electrode, and second transparent layer. Conducting polymers, including poly(aniline), poly(pyrrole), poly(thiophene), poly(phenylene sulfide), and poly(acetylene), may be employed as the electrochromic material. However, poly(phenylene sulfide) and poly(acetylene) are electrochromically poor or inactive. The conducting polymer is paired with a dopant, such as a sulfate or chloride. In the examples in the Bennett et al. patent, the electrolyte is an aqueous acidic solution containing poly(acrylic acid). Liquid propylene carbonate and solid poly(ethylene oxide) are disclosed as alternative electrolytes.

The Bennett et al. device is unable to modulate light in the infrared region for several reasons. First, since the electrolyte layer is contained between the transparent outer layer and the electrochromic material, an incident beam of light must traverse the electrolyte before interacting with the electrochromic material. All of the electrolytes disclosed by Bennett et al. absorb a substantial amount of light in the infrared region. Therefore, the electrolyte layer seriously impedes infrared signals reflected by the Bennett et al. device. Second, all the combinations of conducting polymers and dopants described modulate light in the infrared region extremely poorly or not at all. Lastly, with the exception of poly(ethylene), all the transparent layers described are substantially infrared opaque.

SUMMARY OF THE INVENTION

According to the present invention, a flexible electrochromic device is provided comprising a flexible outer layer, an electrode, and one or more counter electrodes. The electrode comprises an electrochromic conducting polymer layer in contact with the flexible outer layer; and an electrolyte-permeable substrate layer; and a conductive reflective layer disposed between the substrate layer and the electrochromic conducting polymer layer. The electrochromic device further comprises an electrolyte in contact with the conductive reflective layer and the one or more counter electrodes.

According to another embodiment of the invention, an aqueous liquid electrolyte is provided comprising sulfuric acid, poly(vinyl sulfate), and poly(anethosulfonate).

According to another embodiment of the invention, an aqueous prepared solid electrolyte is provided comprising sulfuric acid, poly(vinyl sulfate), poly(anethosulfonate), and poly(vinyl alcohol).

According to another embodiment of the invention, a nonaqueous prepared solid electrolyte is provided comprising poly(ethylene oxide), poly(ethylene glycol), poly(anethosulfonate), poly(vinyl sulfate), and one or more dopants selected from the group consisting of poly(anethosulfonate), p-toluene sulfonate, trifluoromethane sulfonate, poly(vinyl stearate), and poly(vinyl sulfate).

According to another embodiment of the invention, a polymeric matrix is provided comprising one or more conducting polymers selected from the group consisting of poly(diphenyl amine), poly(4-amino biphenyl), poly(aniline), poly(3-alkyl thiophene), and poly(diphenyl benzidine) and one or more dopants selected from the group consisting of poly(anethosulfonate), p-toluene sulfonate, poly(vinyl sulfate), trifluoromethane sulfonate, and poly(vinyl stearate). According to a preferred embodiment, the polymeric matrix comprises poly(aniline), poly(anethosulfonate), and poly(vinyl sulfate).

According to another embodiment of the invention, an electrochromic device comprises: an electrode comprising an electrochromic material; one or more counter electrodes; and an electrolyte in contact with the electrochromic material and the one or more counter electrodes, which electrolyte comprises sulfuric acid, poly(vinyl sulfate) and poly(anethosulfonate).

According to another embodiment of the invention, an electrochromic device is provided comprising: an electrode comprising an electrochromic material; one or more counter electrodes; and an electrolyte in contact with the electrochromic material and the one or more counter electrodes, which electrolyte comprises: poly(ethylene oxide); poly(ethylene glycol); poly(anethosulfonate); poly(vinyl sulfate); and one or more dopants selected from the group consisting of poly(anethosulfonate), p-toluene sulfonate, trifluoromethane sulfonate, poly(vinyl stearate), and poly(vinyl sulfate).

DESCRIPTION OF THE DRAWINGS

For the purpose of illustrating the invention, there is shown in the drawings a form which is presently preferred. It being understood, however, that this invention is not limited to the precise arrangements and instrumentalities shown.

DESCRIPTION OF THE INVENTION

Figure 1:
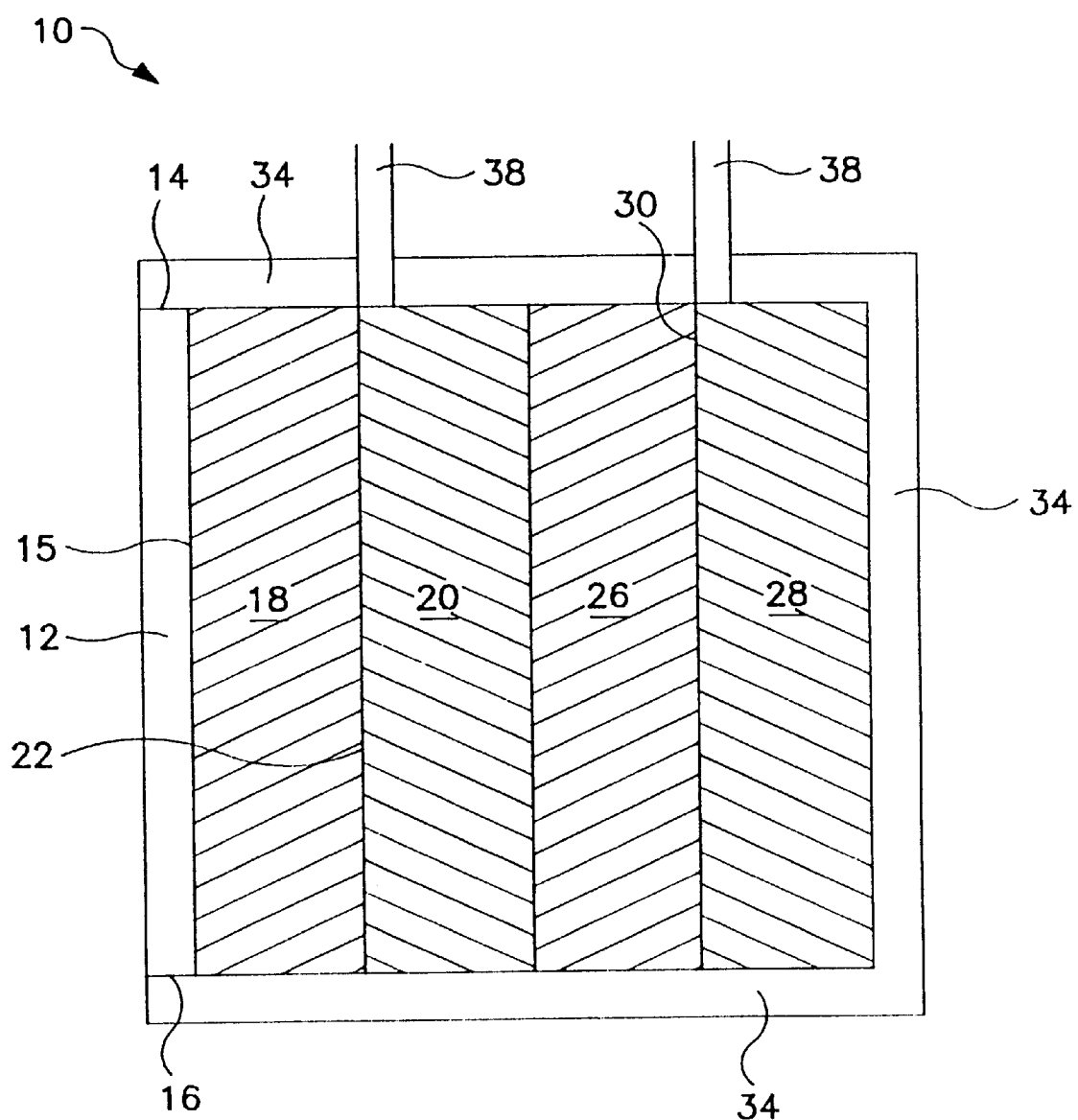
FIG. 1 is a cross-sectional view of an electrochromic device according to the present invention.

Referring to the drawings, wherein like numerals indicate like elements, there is shown in FIG. 1 an electrochromic device 10 according to the invention. A substantially transparent outer layer 12 is located at the viewing side (front) of the device 10. Incident light enters the device 10 through the transparent outer layer 12, which is the front of the device. The transparent outer layer 12 has a top edge 14 and a bottom edge 16. An electrochromic conducting polymer layer 18 is in intimate physical contact with the transparent outer layer 12 along the conducting polymer layer outer surface 15. The electrochromic conducting polymer layer 18 is in contact with an electrolyte-permeable substrate layer 20 along the conducting polymer layer's opposite (i.e., inner) surface. The electrochromic conducting polymer layer 18 may further comprise a dopant. The electrolyte-permeable substrate layer 20 contains a solid electrolyte. Alternatively, the electrolyte-permeable substrate layer 20 may contain a liquid electrolyte instead of a solid electrolyte. The electrolyte-permeable substrate layer 20 has a conductive reflective surface 22. The conductive reflective surface 22 is formed on the surface of the electrolyte-permeable substrate layer 20 by metallization. The conductive reflective surface 22 is in contact with the electrochromic conducting polymer layer 18 and the electrolyte. The electrochromic conducting polymer layer 18, and the electrolyte-permeable substrate layer 20 with the conductive reflective surface 22 deposited thereon, together form a working electrode.

A counter electrode film 26 contacts the electrolyte-permeable substrate layer 20. Preferably, the counter electrode film 26 is formed from a conducting polymer and comprises the same conducting polymer forming the electrochromic conducting polymer layer 18. The counter electrode film 26 is in contact with the electrolyte. A second substrate layer 28 is in contact with the counter electrode film 26. The second substrate layer 28 is comprised of a an electrolyte-permeable or electrolyte-impermeable flexible material. A conductive surface 30 is metallized onto the surface of the second substrate layer 28 contacting counter electrode film 26. The conductive surface 30 is in contact with the counter electrode film 26. The counter electrode film 26, and the second substrate layer 28 with the conductive surface 30 deposited thereon, together form a counter electrode.

Electrical connector 36 attaches to the conductive reflective surface 22 of the electrolyte-permeable substrate layer 20. Electrical connector 38 attaches to the conductive surface 30 of the second substrate layer 28.

The counter electrode formed by film 26 and second substrate layer 28 may be positioned behind the working electrode formed by electrochromic conducting polymer layer 18 and first porous substrate layer 20. This arrangement is shown in FIG. 1. Alternatively, the device 10 may have two or more counter electrodes positioned above and/or below the working electrode as illustrated in FIG. 2.

An encapsulant 34 may surround the electrode/counter electrode assembly, except for the transparent outer layer 12, to enclose the assembly and permit handling. The composition of the encapsulant, and its method of application, is described later. The transparent outer layer 12 may be comprised of the same material as the encapsulant 34, or may be comprised of a different material. The transparent outer layer 12 should be as thin as possible in order to maximize the transmission of the transparent outer layer 12.

In operation, incident light enters the device 10 through the transparent outer layer 12. The incident light traverses the thickness of the electrochromic conducting polymer layer 18 and is reflected by the conductive reflective surface 22. The reflected light traverses the electrochromic conducting polymer layer 18 in the opposite direction of the emitted light and exits the device. The wavelength and intensity of the incident light is modulated by the electrochromism of the electrochromic conducting polymer layer 18.

Figure 2:
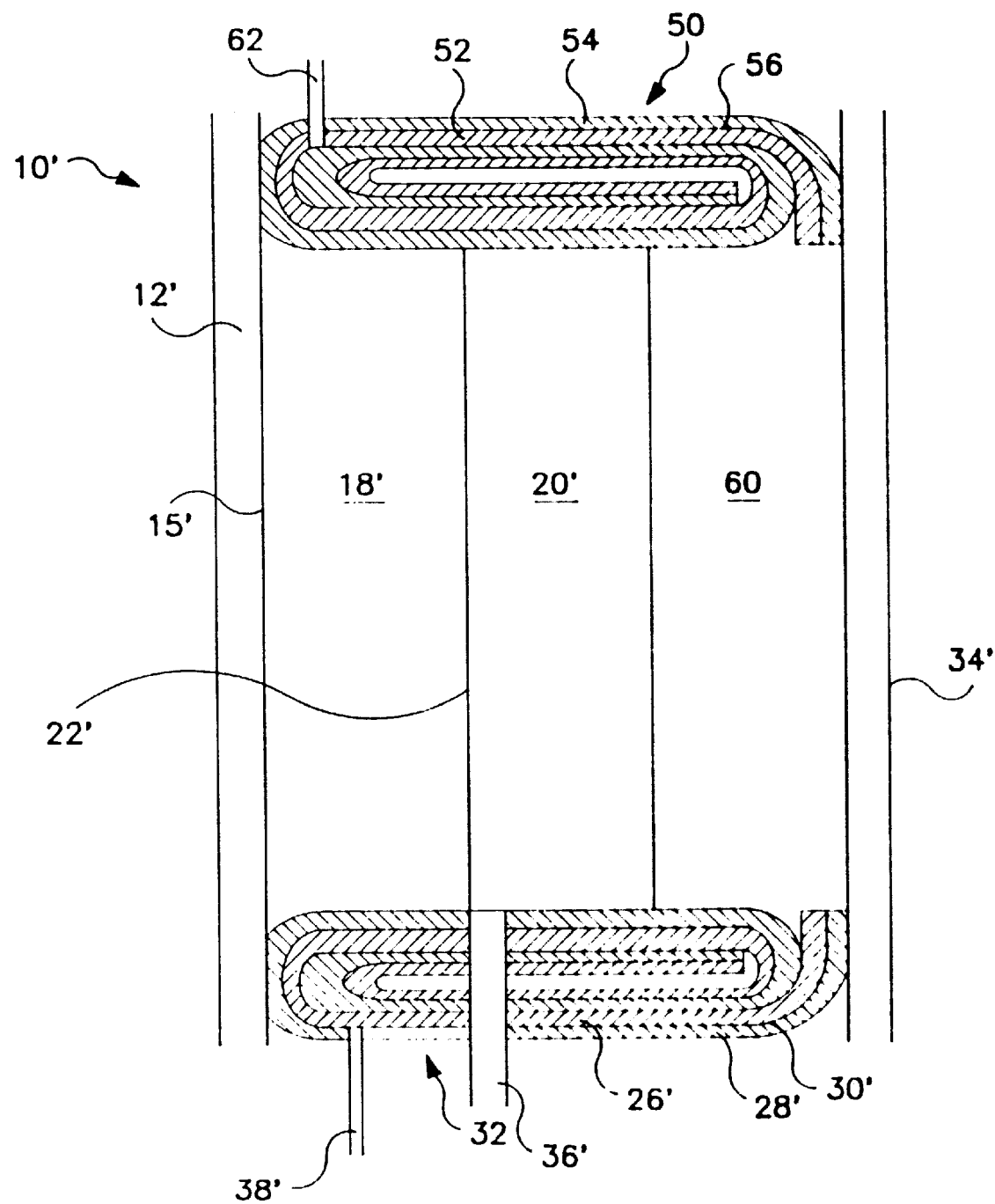
FIG. 2 is a cross-sectional view of a second embodiment of an electrochromic device according to the present invention.

FIG. 2 illustrates an alternative embodiment of the present invention comprising two counter electrodes. An electrochromic conducting polymer layer 18' is in intimate physical contact with transparent outer layer 12' along the conducting polymer outer surface 15'. The electrochromic conducting polymer layer 18' is in contact with an electrolyte-permeable substrate layer 20' along the conducting polymer layer's opposite (i.e., inner) surface. The conducting polymer of layer 18' may contain a dopant. The electrolyte-permeable substrate layer 20' contains a solid or liquid electrolyte. A conducting reflective surface 22' is present on the surface of layer 20' and in contact with electrochromic conducting polymer layer 18' and electrolyte. The electrochromic conducting polymer 18', and the electrolyte-permeable substrated layer 20' with conductive reflective surface 22' deposited thereon, together form a working electrode.

The electrochromic device 10' further contains a first counter electrode 32 and a second counter electrode 50. The two counter electrodes 50 and 32 are positioned at the top and bottom of the working electrode, respectively. Counter electrode 50 comprises a counter electrode film 52 and a substrate layer 54. A conductive surface 56 is metallized onto the surface of the substrate layer 54. The conductive surface 56 is in contact with the counter electrode film 52. Counter electrode 32 comprises a counter electrode film 26' and a substrate layer 28'. A conductive surface 30' is metallized onto the surface of the substrate layer 28'. The conductive surface 30' is in contact with the counter electrode film 26'. Preferably, the second counter electrode 50 is composed of the same materials as the first counter electrode 32.

A substrate layer 60 is disposed between electrolyte-permeable substrate layer 20' and encapsulant 34'. Electrical connectors 36', 38' and 62 attach to the electrolyte-permeable substrate layer 22', conductive surface 30' and conductive surface 56, respectively.

The two counter electrodes 32 and 50 may be rolled (as shown in FIG. 2), much like a tight cigarette wrapper, such that the counter electrode film 26' and 52 of each counter electrode contacts the porous substrate 20' of the working electrode. The electrolyte permeates the rolled up counter electrodes.

The electrolyte-permeable substrate layer 20 provides rigidity to the electrochromic device and support to the electrochromic conducting polymer layer 18. The substrate material of layer 20 should be compatible with the conducting polymer and electrolyte of the device. Also, the substrate material should be capable of being metallized. The substrate material may comprise, but is not limited to, any of the following, or combinations thereof: poly(propylene), poly(ethylene terephthalate), poly(ethylene), poly(methyl methacrylate), poly(ethyl methacrylate), poly(tetrafluoroethylene) and other fluorinated poly(alkylenes), nylon, poly(vinylidene fluoride), acrylics (such as methyl methacrylate synthetic resins, acrylate synthetic resins, and thermoplastic poly(methyl methacrylate)-type polymers), acrylonitrile methyl acrylate copolymers, ethylene vinyl acetate, fluorinated ethylenepropylene resins, poly(carbonates), poly(butylenes), poly(vinyl chloride), poly(urethanes), poly(imides), woven or nonwoven porous manmade or natural textile cloths, and papers (including filter papers). Preferably, the substrate material is poly(propylene), poly(ethylene terephthalate), poly(tetrafluoroethylene), poly(ethylene), nylon or poly(vinylidene fluoride). Most preferably, the substrate material is poly(propylene), poly(ethylene), poly(ethylene terephthalate), poly(vinylidene flouride) or nylon.

The electrolyte-permeable substrate layer 20 may take the form of a sheet or membrane It may be supported or laminated on an inert flexible support such as a support comprising poly(propylene) or poly(tetrafluoroethylene).

The electrolyte-permeable substrate layer 20 is formed of a material which permits passage of electrolyte therethrough. The substrate layers 20 and 28 should have adequate conductivity to conduct a current through the device. This enables electrical contact between the working electrode formed by electrochromic conducting polymer layer 18 and electrolyte-permeable substrate layer 20, and the counter electrode formed by counter electrode film 26 and second substrate layer 28. Electrical contact is maintained through the electrolyte contained in the electrolyte-permeable substrate layer 20.

The electrolyte-permeable substrate layer 20 may comprise any material which may be penetrated by the electrolyte contained in the electrochromic device. For example, substrate layer 20 may comprise any flexible porous, microporous, perforated or microperforated material. Porous and microporous materials are typically characterized by the presence of pores which are generated as a consequence of the material manufacturing process. Materials having pore sizes greater than about 100 $\mu$m are generally known as "porous", while materials having pore sizes of 100 $\mu$m or less are generally known as "microporous".

Perforated and microperforated materials comprise solid materials into which perforations are introduced, typically by mechanical manipulation of the material following manufacture. Perforations may be made by methods such as, but not limited to, physical puncturing and etching. Materials having perforations greater than 100 $\mu$m are generally known as "perforated", while materials having perforations 100 $\mu$m or less are generally known as "microperforated".

Where a microporous substrate is selected as the electrolyte-permeable substrate layer 20, the pores should be smaller than about 25 $\mu$m. At pore sizes larger than 25 $\mu$m, interference with the reflected light in the electrochromic device may occur because the pores in a microporous substrate are typically close together. No such restriction is placed on the perforation size of microperforated substrates, since the perforations are not close together and therefore do not distort the reflected light. Preferably, microporous substrates utilized to form substrate layer 20 have a pore size from about 0.05 $\mu$m to about 10 $\mu$m.

Where a perforated material is used to form substrate layer 20, the perforations have a size of about 0.2 mm, and the perforations are spaced about 1.5 mm apart.

The second substrate layer 28 may comprise any of the materials described for the electrolyte-permeable substrate layer 20, or any flexible natural or plastic material which may be metallized. The material should be chemically and physically compatible with the conducting polymer/dopant and electrolyte.

The conductive reflective surface 22 on the electrolyte-permeable substrate layer 20, and the conductive surface 30 on the second substrate layer 28, may be formed by metallization methods which include, but are not limited to, thermal evaporation, DC magnetron sputtering and electroless plating.

The conductive reflective surface 22 provides electrical contact between the electrochromic conducting polymer layer 18 and the electrolyte. Preferably, the conductive reflective surface 22 and the conductive surface 30 comprise Ir, Pt, Au, Rh, Cu, Ag, or Ni. Most preferably, the electrolyte-permeable substrate layer 20 and the second substrate layer 28 are metallized with Au due to its superior reflectivity in both the visible and infrared regions, excellent mechanical properties, flexibility, chemical inertness and compatibility with conducting polymer/dopant combinations and electrolytes.

The metal must be deposited on the electrolyte-permeable substrate layer 20 such that the porosity of the substrate is maintained. Also, the metallized layer 20 must maintain adequate reflectivity. Preferably, the metal layer is deposited on substrate layers 20 and 28 to a thickness of from about 50 nm to about 600 nm.

The metal may be deposited on the electrolyte-permeable substrate layer 20 through a mask in the pattern of a grid. The deposited metal may be continuous, and may be discontinuous such as in the form of a grid. Where the metallized layer is in the form of a grid, the electrochromic device may alter the wavelength and intensity of incident light in the microwave region of the electromagnetic spectrum. By varying the pattern of the grid and distance between grid lines, different wavelengths of light in the microwave region may be modulated by the device.

The conducting polymer alters the wavelength and intensity of incident light reflected by the device. The selection of the conducting polymer or conducting polymer/dopant combination for the electrochromic conducting polymer layer 18 is critical to the performance of the electrochromic device, especially in the infrared region. Performance criteria of the conducting polymer/dopant combination include high color contrast or multicolors in the visible region, and large and broad band dynamic range in the infrared region. Other performance criteria include thermal stability, environmental stability, mechanical durability and flexibility.

The electrochromic conducting polymer layer 18 may comprise any conducting polymer satisfying the aforementioned performance criteria. Preferably, the electrochromic conducting polymer is poly(diphenyl amine), poly(4-amino biphenyl), poly(aniline), poly(3-alkyl thiophene) (alkyl= methyl through octyl), poly(diphenyl benzidine), poly (phenylene), poly(phenylene vinylene), a poly(allylene vinylene), a poly(amino quinoline) or derivatives or copolymers thereof. The electrochromic conducting polymer layer 18 may also comprise combinations of two or more of the aforementioned conducting polymers.

When poly(aniline) is utilized for layer 18, it is preferably synthesized in an aqueous environment. More preferably, poly(aniline) is synthesized in an acidic aqueous environment. Poly(aniline) may also be synthesized by nonaqueous electropolymerization.

The electrochromic conducting polymers other than poly (aniline) are preferably synthesized in a nonaqueous environment, most preferably in a nonaqueous environment acetonitrile medium.

The electrochromic conducting polymer layer 18 may further comprise, in addition to the conducting polymer, a dopant compatible with the conducting polymer. The dopant may take the form of a polymeric dopant or non-polymeric dopant. In the case of polymeric dopants, a matrix is formed by the conducting polymer and dopant. Preferred polymeric dopants include poly(styrene sulfonate) (as an acid or metal salt), poly(vinyl sulfate) (as an acid or metal salt), poly(vinyl sulfonate) (as an acid or metal salt), poly(anethosulfonate) (as an acid or metal salt) and poly(vinyl stearate). Preferred non-polymeric dopants include p-toluene sulfonate, trifluoromethane sulfonate and {3-hydroxy-4-(2-sulfo-4-(4-sulfophenylazo)phyenylazo]2,7-naphthalenesulfonic acid} and its metal salts. The electrochromic conducting polymer layer 18 may also contain combinations of two or more of the aforementioned dopants.

Preferred conducting polymer/dopant combinations comprise combinations of any of the conducting polymers listed in Table 1 with any of the dopants listed in Table 2.

TABLE 1

Conducting Polymers poly(diphenyl amine)
poly(4-amino biphenyl)
poly(aniline)
poly(3-alkyl thiophene) (alkyl = methyl through octyl)
poly(diphenyl benzidine)

TABLE 2

Dopants poly(anethosulfonate)
poly(vinyl sulfate)
p-toluene sulfonate
trifluoromethane sulfonate
poly(vinyl stearate)

These combinations yield large dynamic range in the mid and far infrared region, good visible region electrochromism, rapid switching speed, and extended cyclability. In addition, these conducting polymer/dopant combinations are thermally durable and possess good mechanical properties including high film integrity. The conducting polymer/dopant combinations do not crack or peel on repeated flexing.

When a conducting polymer is oxidized or reduced, the color of the conducting polymer changes in the visible and infrared regions. During or immediately subsequent to the redox process of the conducting polymer, counterions may flow into or out of the conducting polymer to maintain charge neutrality. For large ions, such as $ClO_4^-$, the counterion flow induces recurrent morphological changes in the conducting polymer. These morphological changes cause physical wear and tear and eventual degradation of the conducting polymer.

In contrast, polymeric dopants do not physically move in and out of the conducting polymer/dopant matrix. The polymeric dopant is enmeshed in the conducting polymer. During oxidation and reduction of the conducting polymer, counter-counterions move in and out of the conducting polymer/dopant matrix. For example, in the case of the polymeric dopant poly(vinyl sulfate), the counter-counterions are alkali metal or $H_3^+O$ cations. These counter-counterions are significantly smaller than the counterions in a conducting polymer with a non-polymeric dopant. Since the counter-counterions are smaller than the counterions in a conducting polymer with a non-polymeric dopant, fewer morphological changes occur in the conducting polymer. Hence, there is less physical wear and tear of a conducting polymer in a conducting polymer/polymeric dopant matrix than in a conduct polymer with a non-polymeric dopant.

Compared to non-polymeric dopants, polymeric dopants allow for more rapid switching, greater electrochromic efficiency and slower degradation of the conducting polymer. Furthermore, polymeric dopants increase the flexibility and mechanical durability of the conducting polymer.

The polymeric dopant utilized in the device of the present invention may also contribute to the modulation of light in the infrared region. In some cases, upon oxidation and reduction, morphological changes are induced in the polymeric (or other macrocyclic) dopant. These morphological changes are of the dimension of infrared light, especially long wave infrared light. Thus, the dopants may alter the wavelength and intensity of light in the infrared region. In particular, the dopants poly(anethosulfonate) and poly(vinyl sulfate) can greatly modulate light in the infrared region.

Where a conducting polymer/dopant matrix is selected as the material forming the electrochromic conducting polymer layer 18 and counter electrode film 26, the conducting polymer/dopant matrix may be formed on the substrate layers 20 and 28 of the electrodes by electrochemical polymerization. The electrochemical polymerization is performed by placing an electrode in a solution comprising a solvent containing the monomer and dopant matrix. For aqueous-system electrochemical polymerization the solvent is water; for nonaqueous-system electrochemical polymerization the solvent is a nonaqueous solvent, e.g., an organic solvent such as acetonitrile. A potential is applied across the electrode for a short period of time, usually 1–10 minutes for aqueous polymerization systems, and 5–45 minutes for nonaqueous polymerization systems. The result is the formation of a conducting polymer/dopant matrix on the electrode.

The electrolyte in the electrochromic device 10 of the present invention may comprise any liquid or solid electrolyte compatible with the conducting polymer or conducting polymer/dopant combination in the electrochromic conducting polymer layer 18. When the electrochromic conducting polymer layer 18 contains a conducting polymer/dopant matrix, the electrolyte should contain the polymeric dopant incorporated in the conducting polymer/dopant matrix. The dopant in the electrolyte allows for easier flow of ions between the electrolyte and conducting polymer/dopant matrix.

For the conducting polymer poly(aniline) or a derivative thereof, an aqueous liquid electrolyte is preferred. For example, a preferred liquid electrolyte for a device containing the conducting polymer poly(aniline) and a dopant in the electrochromic conducting polymer layer 18 comprises deionized water, sulfuric acid and dopant.

A preferred liquid electrolyte for an electrochromic device, having the conducting polymer/dopant matrix poly(aniline)/poly(vinyl sulfate)-poly(anethosulfate), comprises a solution of 0.05 to 0.4M sulfuric acid, 0.02 to 0.4M poly(vinyl sulfate) as a sodium or potassium salt, and 0.002 to 0.025M poly(anethosulfonate) in deionized water. The solution may be heated for better dissolution of the ingredients.

Where a conducting polymer other than poly(aniline) is utilized for electrochromic conducting polymer layer 18, a nonaqueous liquid electrolyte is preferred over an aqueous liquid electrolyte.

A preferred liquid electrolyte for an electrochromic device, having the conducting polymer/dopant combination poly(diphenyl amine)/p-toluene sulfonate, comprises p-toluene sulfonate in acetonitrile or propylene carbonate. Preferably, this liquid electrolyte for such a device comprises 0.02 to 0.4M p-toluene sulfonate in acetonitrile.

For electrochromic devices containing acidic liquid electrolytes, such as hydrochloric acid and sulfuric acid, the electrolyte may also contain one or more gelling agents such as poly(vinyl alcohol) or poly(vinyl pyrrolidone).

In order for gelled liquid electrolytes to achieve ambient temperature conductivity adequate for acceptable electrochromic performance, the electrolyte should maintain sufficient flow and liquid properties. Electrolytes which meet this requirement typically take the form of highly viscous gels.

The electrolyte in the electrochromic device 10 may take the form of a solid electrolyte. The solid electrolyte may be prepared from an aqueous or nonaqueous solution, that is, a solution comprising an aqueous solvent (i.e., water) or a nonaqueous solvent (i.e., an organic solvent). A solid electrolyte prepared from an aqueous solution is hereinafter referred to as an "aqueous prepared solid electrolyte". A solid electrolyte prepared from a nonaqueous solution is hereinafter referred to as an "nonaqueous prepared solid electrolyte". In either case, the finished solid electrolyte may or may not contain residual solvent from the preparation process, but typically does so. The solid electrolyte will typically contain about 5–10% residual solvent.

In an electrochromic device containing a conducting polymer/dopant matrix including a polymeric dopant, a useful aqueous prepared solid electrolyte may comprise an acidic electrolyte based on poly(vinyl alcohol) incorporating the polymeric dopant. The poly(vinyl alcohol) allows the electrolyte to form a solid. In such a solid electrolyte, the polymeric dopant provides ion channels for the counter-counterions associated with the polymeric dopant of the conducting polymer/dopant matrix. The ion channels funnel the counter-counterions along the backbone of the polymeric dopant of the electrolyte. This greatly increases the conductivity of the electrolyte. Also, the polymeric dopant incorporated in the electrolyte immobilizes the poly(vinyl alcohol). The polymeric dopant of the electrolyte imparts much greater flexibility, mechanical durability and integrity than the poly(vinyl alcohol) electrolyte would possess without the polymeric dopant. The solid electrolyte and the conducting polymer/dopant matrix contain the same dopant. Thus, the solid electrolyte is compatible with the conducting polymer/dopant matrix.

A preferred solid electrolyte composition comprises sulfuric acid, poly(anethosulfonate), poly(vinyl sulfate), poly(vinyl alcohol), and water in the following molar proportions: 100–800 sulfuric acid; 1–200 poly(anethosulfonic acid); 20–800 poly(vinyl sulfate); 2000–10000 poly(vinyl alcohol); and water (molar proportions of polymers are based upon monomer). The solid electrolyte may be prepared, for example, by mixing a solution of 0.0005 to 0.1M poly(anethosulfonate), 0.01 to 0.4M poly(vinyl sulfate), 0.05 to 0.4M sulfuric acid, and 1 to 5M poly(vinyl alcohol) in 15 to 50 mL (0.83 to 2.8 moles) deionized water. The average molecular weight of the poly(vinyl alcohol) may vary substantially, but is typically about 200,000. The solution is then heated with stirring to a temperature between about 60° C. and the boiling point of the solution, until the ingredients are dissolved. From about 0.05 to about 1 w/w % poly(ethylene-co-methyl acrylate-co-acrylic acid) may optionally be added to the solution to further improve the mechanical properties of the electrolyte. The volume of the solution is then reduced by 5 to 70% by evaporation. From about 1% to about 85% of the original amount of deionized water remains in the electrolyte after evaporation. The solution is solidified by cooling with stirring to yield the solid electrolyte.

A preferred nonaqueous solid electrolyte for use in the electrochromic device of the present invention is comprised of poly(ethylene oxide), poly(ethylene glycol), a dopant identical to the dopant in the conducting polymer/dopant matrix and a polymer additive to enhance ion conduction. The polymer additive may comprise, for example, a mixture of poly(vinyl sulfate) and one or more of poly(anethosulfonate), poly(ethyl or methyl methacrylate), or poly(ethylene-co-methyl acrylate-co-glycidyl methacrylate) (PEMAGM).

One preferred nonaqueous prepared solid electrolyte comprises 0.1 to 1 w/w % of PEMAGM, 0.2 to 4 w/w % poly(ethyl or methyl methacrylate), and the following additional components in the following molar proportions: 50–1000 poly(ethylene oxide); 10–100 poly(ethylene glycol); 1–50 p-toluene sulfonate; 10–50 trifluoromethane sulfonate; 1–5 poly(vinyl sulfate); 1–5 poly(anethosulfonate); and acetonitrile.

To form the aforementioned solid electrolyte, a solution is first prepared containing 0.05 to 1.0M of poly(ethylene oxide), 0.01 to 0.1M of poly(ethylene glycol) 0.001 to 0.05M of p-toluene sulfonate, 0.01 to 0.05M trifluoromethane sulfonate, 0.001 to 0.005M of poly(vinyl sulfate) and/or poly(anethosulfonate), 0.2 to 4 w/w % of poly(ethyl or methyl methacrylate), 0.1 to 1 w/w % of PEMAGM and 40 to 150 mL acetonitrile. The average molecular weight of the poly(ethylene oxide) may vary substantially, but is typically about 600,000 g/mol. The average molecular weight of the poly(ethylene glycol) may vary substantially, but is typically about 1,500 g/mol. The solution is heated with stirring until the contents of the solution are dissolved. The acetonitrile is then slowly evaporated off in a rotary evaporator or on a vacuum line, yielding the solid electrolyte. Approximately, between 1% and 85% of the original amount of acetonitrile remains in the electrolyte.

Once the working electrode formed by electrochromic conducting polymer layer 18 and electrolyte-permeable substrate layer 20, and the counter electrode formed by counter electrode film 26 and second substrate layer 28, are fabricated and the electrolyte is synthesized, a coating is directly applied to the exposed conducting polymer layer outer surface 15 to create a transparent outer layer 12. The coating also serves to protect the device from minor abrasive effects and damage.

The coating forming transparent outer layer 12 may comprise any flexible material which is substantially (at least approximately 50% transmission) transparent in the visible region of the electromagnetic spectrum. The coating should also be substantially transparent in the infrared region when applied to the working electrode as a thin coating. Preferred coating materials include poly(ethylene terephthalate) and other polyesters, poly(ethylene), poly(propylene), poly(methyl methacrylate), poly(ethyl methacrylate), acrylics (such as methyl methacrylate synthetic resins, acrylate synthetic resins, and thermoplastic poly(methyl methacrylate)-type polymers), acrylonitrile methyl acrylate copolymers, ethylene vinyl acetate, fluorinated ethylenepropylene resins, fluorinated poly(alkylenes), polyvinyl alcohol and poly(ethylene glycol), poly(vinyl chloride), and any combination thereof. More preferred coating materials are poly(ethyl methacrylate), poly(ethylene), acrylics, and poly(ethylene terephthalate). Most preferably, the coating is poly(ethylene).

Preferably, the coating is applied by heat sealing or coated onto the conducting polymer surface 15. Where the coating is composed of poly(ethyl methacrylate), the coating material is preferably applied in the form of a solution in an organic solvent, such as acetonitrile or toluene.

The temperature of the heat applied and the duration that the heat is applied are critical when heat sealing the coating to the conducting polymer surface 15. If the sealing is not performed properly, the conducting polymer may become moribund or damaged. More importantly, the electrolyte may be unable to contact the conducting polymer surface 15 if the heat sealing is not properly performed.

The coating poly(ethylene) is preferably heat sealed to the conducting polymer surface 15. The poly(ethylene) is preferably in the form of a thin sheet, having a preferable thickness from about 0.25 to about 1.5 mil (6 to 38 $\mu$m). The thin sheet may be heat sealed directly onto the conducting polymer surface 15 of the working electrode. During the heat sealing of the coating to the conducting polymer surface 15, the temperature of the heat applied and the duration that the heat is applied need to be controlled to avoid damage and degradation to the electrochromic conducting polymer layer 18.

For a device comprising the coating poly(ethylene) and the preferred conducting polymer/dopant combinations of the present invention, a heat seal temperature between 90° C. and 140° C. for 1 to 30 seconds is preferred. The temperature and duration may vary depending on the thickness of the poly(ethylene) and the specific conducting polymer/dopant combination.

A preferred coating composition for application of poly(ethyl methacrylate) as the coating to the conducting polymer surface 15 comprises 1 to 5 w/w % poly(ethyl methacrylate) in acetonitrile or toluene. The coating is preferably applied to the dry conducting polymer surface 15 on the working electrode with an applicator. The coating should completely cover the conducting polymer surface 15 while being as thin as possible.

The coating applied to conducting polymer surface 15 to form transparent outer layer 12 may be extended to encase the entire electrochromic device, except for a small fill hole on the top of the device located between the working electrode and the counter electrode, to form the encapsulant 34. Alternatively, the encapsulant 34 may be comprised of a different coating than the transparent outer layer 12. The coating is applied to the back and sides of the device. The coating does not have to extend around all the exposed surfaces of the electrodes. The electrical connectors 36 and 38 should remain exposed. The encapsulant 34 serves to protect the device from minor abrasive effects and damage.

The liquid or molten solid electrolyte may be poured into the device, after the coating is applied, through the small fill hole. During pouring, the device may be manipulated to allow the electrolyte to uniformly form between the working electrode and the counter electrode. Once the electrolyte is poured into the device, the fill hole is sealed. The fill hole may be sealed immediately or several days after filling.

To install a solid electrolyte into the electrochromic device of the invention, the solid electrolyte may be reheated until it melts. The melted electrolyte may then be poured into the electrochromic device. The electrolyte solidifies when the electrochromic device is cooled. Further solvent loss from the electrolyte occurs after the electrolyte is poured onto the device and before sealing of the fill hole.

When a melted solid electrolyte is poured into the electrochromic device, capillary action in the device forces the solid electrolyte into the pores of the electrolyte-permeable substrate layer 20. This creates edge-effect electrolytic contact between the electrochromic conducting polymer layer 18 and the solid electrolyte. The electrolyte-permeable substrate layer 20 may be massaged through the transparent outer layer 12 and encapsulant 34 or soaked in solid electrolyte to ensure a good distribution of the solid electrolyte in the pores of the substrate layer 20.

Figure 3A:
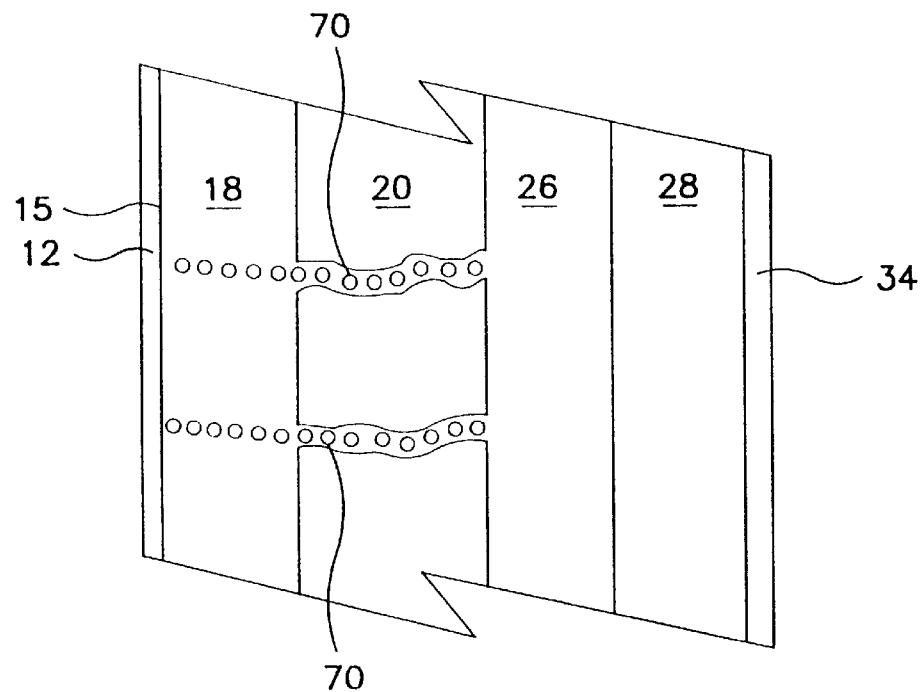
FIG. 3A is a partial cross-sectional view of the electrochromic device in FIG. 1 before "break-in".

As shown in FIG. 3A, after the electrochromic device 10 is assembled, the electrolyte 70 is contained in the pores of the first porous substrate layer 20 and contacts the electrochromic conducting polymer layer 18. The electrical contact between the electrolyte 70 and the electrochromic conducting polymer layer 18 is an edge effect rather than a surface effect. Therefore, there is minimal direct contact between the conducting polymer surface 15 and the electrolyte 70.

In order to increase the electrical contact between the electrolyte and the electrochromic conducting polymer layer, the device should be "broken-in" by cycling the device up to 100 times between its extreme electrochromic states before being put to use. Cycling is performed by varying the applied potential across the device to yield different electrochromic states.

Figure 3B:
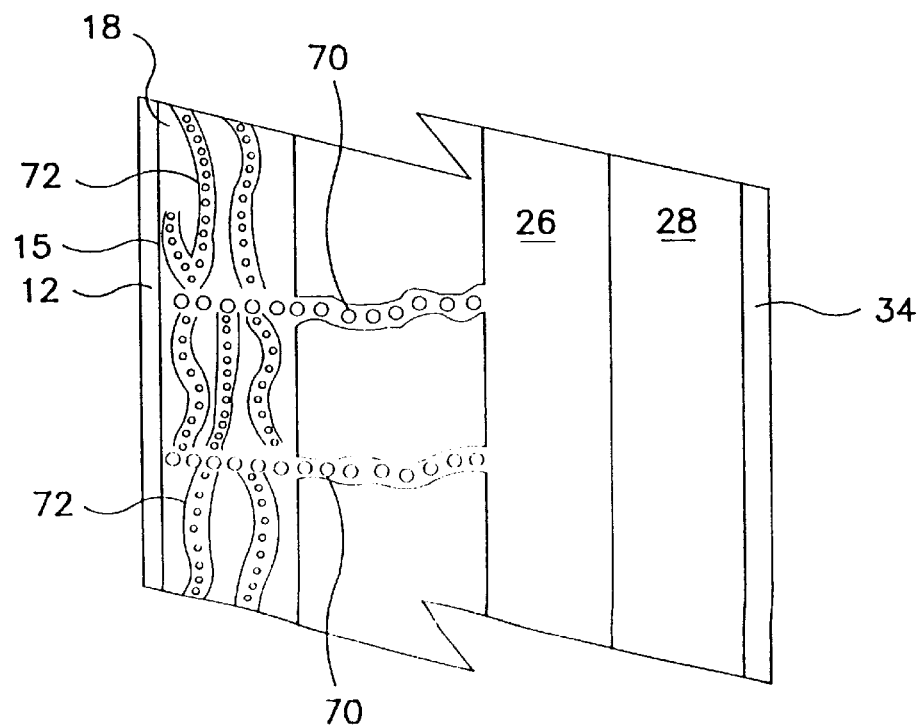
FIG. 3B is a partial cross-sectional view of the electrochromic device in FIG. 1 after "break-in".

FIG. 3B shows the electrochromic device 10 after assembly and "break-in". Break-in leads to the formation of ion channels 72 in the electrochromic conducting polymer layer 18. After break-in, the edge contact between the electrolyte 70 and the electrochromic conducting polymer layer 18 is sufficient to permit adequate conduction through the electrochromic conducting polymer layer 18 due to the ion channels 72.

The electrochromic conducting polymer swells during the "break-in" process. The polymer swells and contracts during doping and de-doping, i.e. oxidation and reduction, of the polymer, but to a lesser extent. Oxidation or reduction of the electrochromic conducting polymer occurs when the potential applied across the electrochromic device is varied. A rigid encapsulant, such as glass, would impede the swelling and contracting of the polymer. Therefore, a flexible encapsulant is required to permit the swelling and contracting of the electrochromic conducting polymer.

An electrochromic conducting polymer may be a p-type or n-type conducting polymer. P-type conducting polymers in their reduced state are substantially transparent. P-type conducting polymers in their oxidized state, are highly absorptive.

In operation, the color of the electrochromic conducting polymer layer 18 may be changed by varying the potential applied across the electrochromic conducting polymer layer 18. In one embodiment of the device, the electrochromic conducting polymer layer 18 comprises a p-type conducting polymer. To change the color of the electrochromic device, the potential across the conducting polymer is varied. When a positive potential is applied to the electrochromic conducting polymer layer 18, the conducting polymer becomes highly colored, i.e., has high absorption. As the potential applied to layer 18 is decreased and becomes negative, the conducting polymer becomes more transparent and less absorptive. When the electrochromic conducting polymer reaches its fully reduced state, it is substantially transparent.

The intensity of incident visible as well as infrared light reflected by the device may be altered by the conducting polymer/dopant matrix. The dopant may contribute substantially to the absorption and scattering of the incident light. The scattering of the incident light is also dependent on the particle size and conductivity of the conducting polymer/dopant matrix. Both the particle size and conductivity of the conducting polymer/dopant matrix vary with the amount of applied potential. Therefore, the intensity of incident light reflected by the electrochromic device may be varied by altering the potential applied to the conducting polymer/dopant matrix.

Devices according to the present invention containing a poly(aniline)-poly(vinyl sulfate)/ poly(anethosulfonate) conducting polymer/dopant matrix provide color in the visible spectral region ranging from glass-clear-transparent upon application of a negative potential through light green, dark green, green-blue and a very dark green-blue-black as the potential is increased. Glass clear transparency under negative potential is also exhibited, for instance, by the conducting polymers poly(diphenyl amine) and poly(diphenyl benzidine) when combined with an appropriate dopant. In the IR spectral region, when a positive potential is applied, the device exhibits a broad band low reflectance at wavelengths from about 2.5 to about 23 $\mu$m. At negative applied potentials, the device exhibits broad band high reflectance.

The reflectance of poly(aniline)-poly(vinyl sulfate)/poly(anethosulfonate) devices steadily increases as the applied potential decreases. The reflectance of the device is slightly masked when the conducting polymer surface 15 is coated with a poly(ethylene) coating. The poly(ethylene) coating absorbs light at wavelengths of about 7, 9 and 13 $\mu$m. The reflectance of the device is undistorted when a thin coating, such as poly(ethyl methacrylate), instead of poly(ethylene) is applied to the conducting polymer surface 15. The reflectance of the device is virtually unaffected by a poly(ethylene) coating in the near-infrared region 0.8 to 1.2 $\mu$m, mid-infrared region 3 to 5 $\mu$m and long wave infrared region 8 to 14 $\mu$m. The dynamic range of the device is large in the visible and infrared regions.

Devices according to the present invention containing poly(aniline) in the electrochromic conducting polymer layer 18 have switching times from extreme dark to light states of from about 0.1 to about 1.0 seconds (transition from 10% to 90% of steady state).

Devices according to the present invention containing the conducting polymer/dopant combination poly(diphenyl amine)/p-toluene sulfonate provide color ranging from transparent upon application of a negative potential through light green, to dark green, to dark green-brown upon application of a positive potential. In the near-infrared region 0.8 to 1.2 $\mu$m, mid-infrared region 3 to 5 $\mu$m and long wave infrared region 8 to 14 $\mu$m, the conducting polymer/dopant combination poly(diphenyl amine)/p-toluene sulfonate exhibits large and broad band dynamic range similar to poly(aniline) devices. The switching time between extreme electrochromic states in poly(diphenyl amine)/p-toluene sulfonate devices is from about 0.5 to about 1.5 sec (10%–90% steady state).

A DC potential may be continuously applied to the electrochromic material until the desired electrochromic state is achieved. The DC potential may then be removed, if the electrochromic material has good open circuit memory. In order to maintain the electrochromic material at the electrochromic state, the electrochromic material should be periodically refreshed. The electrochromic material may be refreshed by the application of a DC potential to the electrochromic material, identical to the initial DC potential. The potential may be pulsed or continuously applied to the electrochromic material.

The continuous application of a DC potential to maintain a desired electrochromic state causes the electrochromic material to constantly experience an electrochemical current. This causes physical wear and tear of the electrochromic material resulting in degradation of the electrochromic material.

A pulse method of control may be applied to the device to achieve the desired electrochromic state. Such a pulsed method may cause minimal physical wear and tear of the electrochromic material. This would significantly increase the cyclability of the device.

One pulse method is to apply a potential significantly greater than the desired potential to the device for short periods of time. For example, if the desired electrochromic state requires a potential (equilibrium or open circuit) of +0.7V, a potential of between +1.0 and +3.0V may be pulsed for a duration of milliseconds or microseconds. The pulses are spaced with comparatively long rest periods, e.g., 100 milliseconds rest periods. With each successive pulse, the open circuit or equilibrium potential of the electrochromic material approaches the desired +0.7V. A sensing circuit measures the open circuit potential of the device. As the potential across the electrochromic material approaches the desired +0.7V, the magnitude of the pulse is reduced. For example, if the original voltage was +2.0V, it may be reduced to +0.5V as the electrochromic material nears +0.7V.

The control circuit may be assembled with commercial off-the-shelf electronic components and custom written software. Preferably, a personal computer controls the potential applied to the device. This control method increases cyclability of electrochromic devices by an average of one to two orders in magnitude.

The device of the present invention, comprising an outer flexible layer in intimate contact with an underlying electrochromic conducting polymer layer, embodies a significant departure from prior electrochromic devices in which these layers were spaced apart and separated by electrolyte. Surprisingly, the devices of the present invention are electrochromically active even though access of electrolyte and ions to the surface of electrochromic conducting polymer 18 is blocked by that layer's intimate contact with outer layer 12.

Accessibility of the electrolyte, and thus electrical contact with the electrochromic conducting polymer layer 18, is from the side in the present devices. Thus, electrolyte contact is an edge effect rather than a surface effect, (FIG. 3A). Since there is no direct electrical contact of the electrochromic conducting polymer surface via electrolyte, the devices of the invention must be cycled repeatedly between extreme electrochromic states to attain substantial void space and swelling of the electrochromic conducting polymer, which results in formation of conduction and ion channels as in FIG. 3B.

Because outer layer 12 and electrochromic conducting polymer layer 18 are in intimate contact, electrolyte will not accumulate between them. Thus, unlike prior electrochromic devices, there is no intervening electrolyte to absorb incident light before being modulated by the electrochromic conducting polymer. This is a substantial improvement over prior devices in which incident light must pass through a region of electrolyte before reaching the electrochromic material layer. Although the electrolytes which have been used in prior devices may have been substantially transparent in the visible region of the electromagnetic spectrum, they have been typically highly absorbing in the infrared region. Thus, even very thin layers of electrolyte were responsible for significant infrared signal reduction.

The devices of the present invention, which dispense with electrolyte between the outer layer 12 and the electrochromic material, do not suffer from the aforesaid infrared signal reduction due to absorption by electrolyte. Moreover, since the incoming light is not forced to pass through the electrolyte, opaque or even infrared-opaque solid or liquid materials may be employed as electrolytes, since they will not interfere with the working electrode's signal modulation.

EXAMPLES

In the Examples which follow, electrochemical polymerization of each conducting polymer onto each electrode was performed in 3-electrode mode (Pt quasi reference electrode) with a Princeton Applied Research Corp. (PARC) Model 263 potentiostat/galvanostat controlled by a personal computer running PARC's 250/270 software. In some experiments a Bioanalytical Systems Model PWR-3 high current potentiostat was used in lieu of the PARC Model 263 potentiostat.

Diffuse ultraviolet-visible-near infrared (UV-Visible-NIR), diffuse infrared (diffuse IR), specular UV-Visible-NIR, and specular infrared (specular IR) spectroscopy was performed on each device while maintaining a constant potential across the electrochromic material of the device. The potential to apply across each device was determined from the characterization cyclic voltammogram of the device. The cyclic voltammogram varied slightly between devices, even devices having identical conducting polymer/dopant combinations. Thus, the potential applied to each device varied.

Infrared spectroscopy was performed with a Perkin-Elmer Model 1615 Fourier Transform Infrared (FTIR) spectrometer controlled by a personal computer running Perkin-Elmer's Grams-Analyst software. Specular and diffuse reflectance were measured with reflectance measurement adapters manufactured by LabSphere for Perkin-Elmer. The specular IR measurements were referenced to a mirror supplied by Perkin-Elmer. The diffuse IR measurements were referenced to FTIR-grade KBr powder (Aldrich Chemical) as instructed by Perkin-Elmer. In the case of the diffuse IR measurements, reflected energy was maximized prior to each run. The reference KBr powder was a much poorer scatterer than the electrochromic devices tested. This caused reflectance values greater than 100% to be frequently obtained.

UV-Visible-NIR reflectance measurements were performed with a Perkin-Elmer Model Lambda-12 spectrophotometer controlled by a personal computer running Perkin-Elmer's UVWinlab software. Specular and diffuse UV-Visible-NIR reflectance were measured with reflectance measurement adapters manufactured by LabSphere for Perkin-Elmer. The specular UV-Visible-NIR measurements were referenced to a mirror. The diffuse UV-Visible-NIR measurements were referenced to a Spectrolon ($BaSO_4$) sphere supplied by Perkin-Elmer.

EXAMPLE 1

The substrate of the working electrode was a microporous poly(vinylidene fluoride) membrane, which was commercially obtained. The substrate of the counter electrode was a thin, non-porous poly(ethylene terephthalate) sheet. Gold was deposited onto the substrates of both electrodes to a thickness of 300 nm by DC magnetron sputtering. The substrates were then cut with scissors to 2.5 cm×5 cm (1"×2"). The counter electrode was cut in such a fashion that a small strip protruded from the counter electrode. The small strip permitted easy electrical connection to an electrical source.

Electrochemical polymerization of poly(aniline) was performed on each electrode to form a poly(aniline) film on each electrode. Each electrode was placed in a deionized water solution containing 0.2M $H_2SO_4$, 0.2M K salt of poly(vinyl sulfate), 0.005M salt of poly(anethosulfonate) and 0.05M aniline.

A potential of +0.8V (vs. Pt quasi reference) was applied for 1 minute to the working electrode while in the deionized water solution. After the 1 minute, a potential of +0.6V was applied for 2 minutes to the working electrode.

A potential of +0.8V (vs. Pt quasi reference) was applied for 1 minute to the counter electrode while in the deionized water solution. After the 1 minute, a potential of +0.6V was applied for 3 minutes to the counter electrode.

The electrodes were washed in deionized water and dried.

A liquid electrolyte was prepared by mixing a solution of 0.2M $H_2SO_4$, 0.004M poly(anethosulfonate), and 0.2M K salt of poly(vinyl sulfate) in deionized water. The solution was heated to 60° C. with stirring. The solution was evaporated to 90% of its original volume. The solution was then cooled.

Poly(ethylene) having a thickness of 1.15 mil (29 μm) was heat sealed onto the exposed conducting polymer surface of the working electrode at about 103° C. for 5 seconds. The working electrode and the counter electrode were positioned such that the gold surface of the counter electrode faced the non-metallized surface of the substrate of the working electrode. A small gap separated the working electrode and the counter electrode. Poly(ethylene) having a thickness of 1.15 mil was heat sealed around the electrodes at about 103° C. for 5 seconds. The previously heat sealed conducting polymer surface was not heat sealed with the poly(ethylene) having a thickness of 1.15 mil. A small fill hole between the two electrodes was formed by the poly(ethylene). An electrical connector tab was heat sealed onto the gold surface of the substrate of the working electrode.

The liquid electrolyte was poured into the fill hole. The device was gently massaged to uniformly spread the electrolyte. Excess electrolyte was squeezed out of the device through the fill hole. The fill hole was then heat sealed.

The device was repeatedly cycled between +0.5V and −0.5V (2-electrode mode) until a recognizable cyclic voltammogram was observed. The potential limits were then extended until two peaks were observed in the voltammogram. Typically, the cycling limits were extended to +0.8V and −0.8V, although the cycling limits varied from device to device.

The end point potentials of the voltammogram and three potentials approximately equi-distant between the end point potentials were selected from the cyclic voltammogram. The diffuse UV-Visible-NIR, diffuse IR, specular UV-Visible-NIR and specular IR spectra were obtained for the device at each of these applied potentials.

Figure 4:
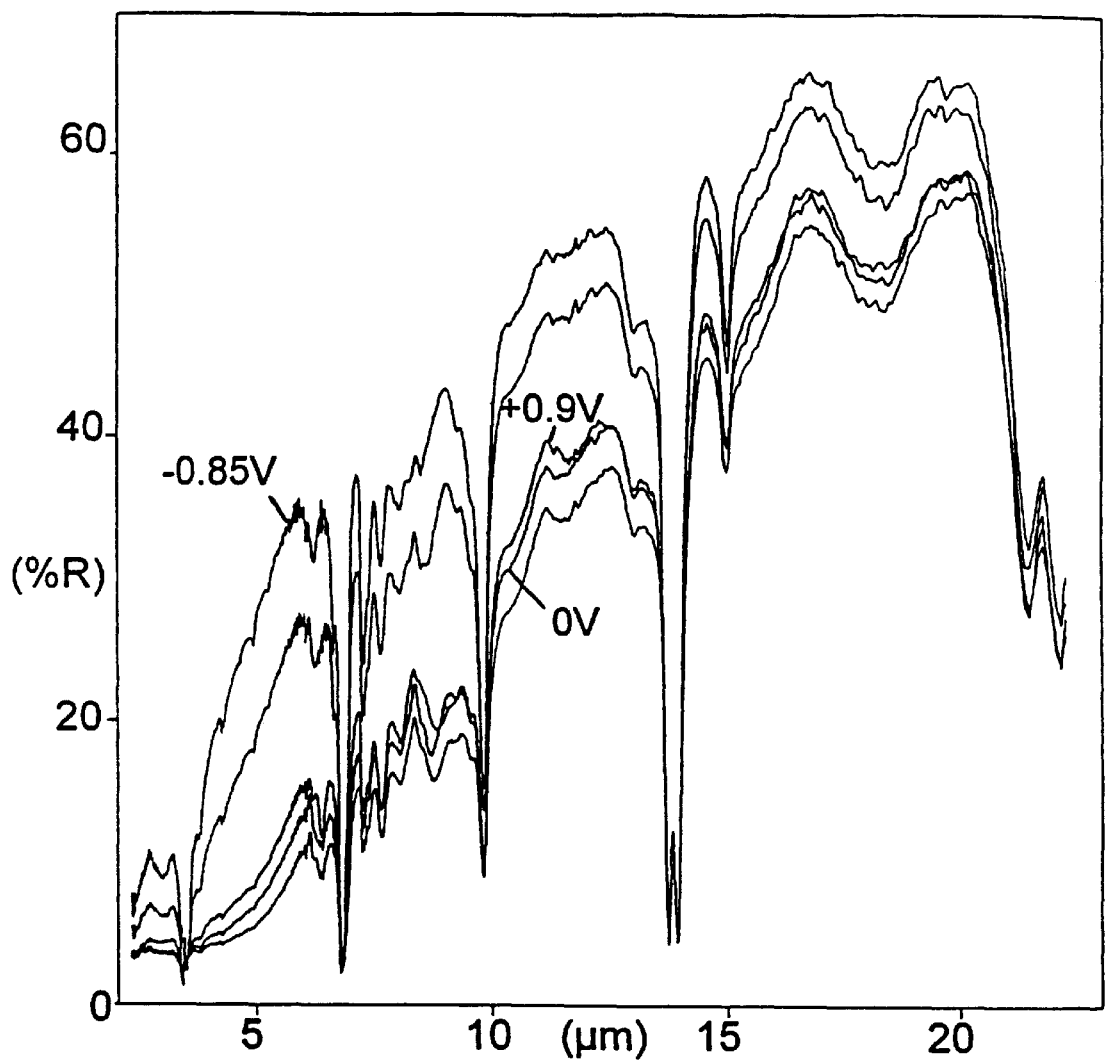
FIG. 4 is a specular Fourier Transform Infrared (FTIR) spectrum of the electrochromic device of Example 1.
Figure 5:
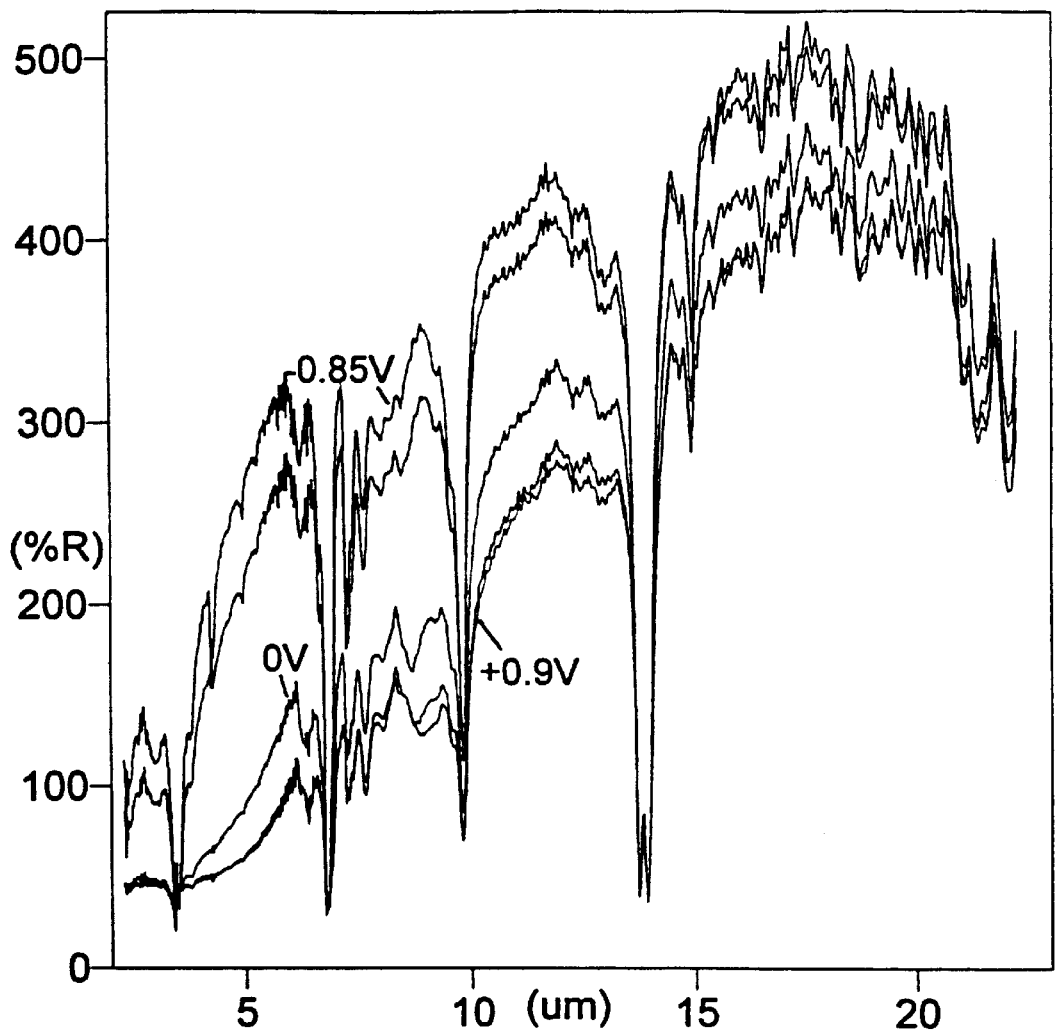
FIG. 5 is a diffuse FTIR spectrum of the electrochromic device of Example 1.
Figure 6:
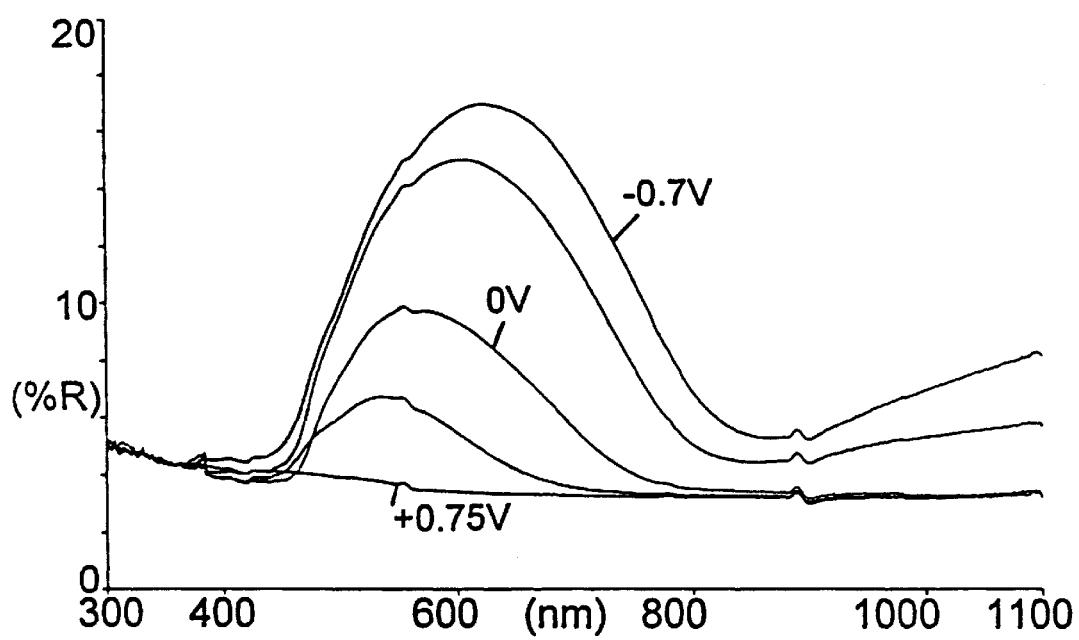
FIG. 6 is a diffuse Ultraviolet-Visible-Near Infrared (UV-Visible-NIR) spectrum of the electrochromic device of Example 1.

FIGS. 4, 5 and 6 are specular FTIR, diffuse FTIR, and diffuse UV-Vis-NIR spectra, respectively, for this device. The specular UV-Visible-NIR spectra (not shown) did not convey any information beyond the information conveyed by diffuse UV-Visible-NIR spectras. The spectra were obtained while maintaining a constant potential (2-electrode mode) across the device. As illustrated in FIGS. 4, 5 and 6, the dynamic range of the device was very substantial.

The absorptions at the wavelengths 7, 9 and 13 μm, which mask the dynamic range near those wavelengths, are characteristic of poly(ethylene), which forms the encapsulant. The application of a thinner poly(ethylene) layer on the surface of the working electrode would reduce this masking substantially.

In the diffuse UV-Visible-NIR spectra, the dynamic range was less broad band then in the spectra FTIR and diffuse FTIR spectras. A broad reflectance maximum at 620 nm, indicative of the transparent to green to dark green-blue-black color change of this device.

EXAMPLE 2

The device was substantially identical to the device in Example 1, except that the substrate of the working electrode was a microperforated poly(ethylene terephthalate) membrane instead of a microporous poly(vinylidene fluoride) membrane.

Figure 7:
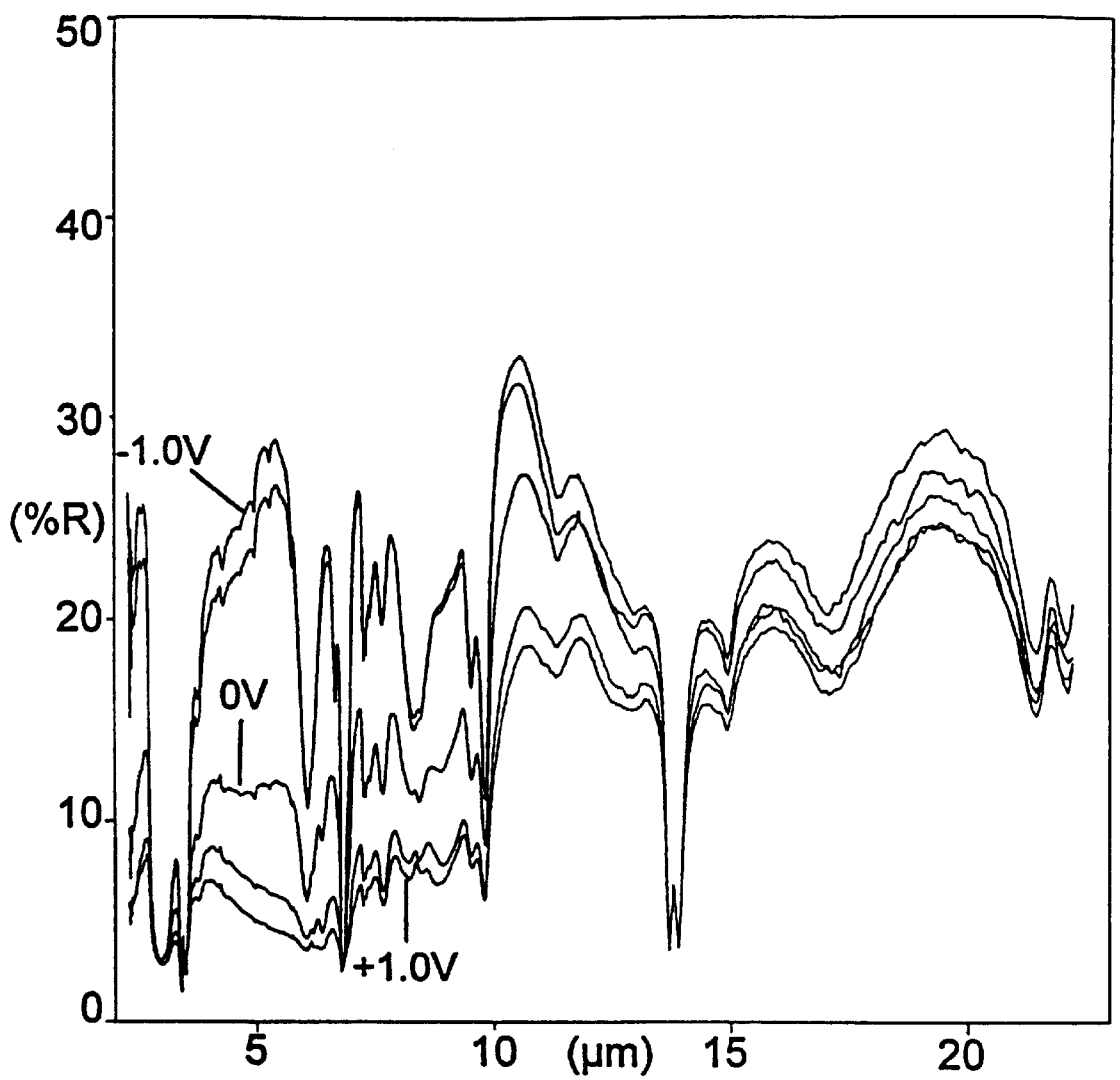
FIG. 7 is a specular FTIR spectrum of the electrochromic device of Example 2.
Figure 8:
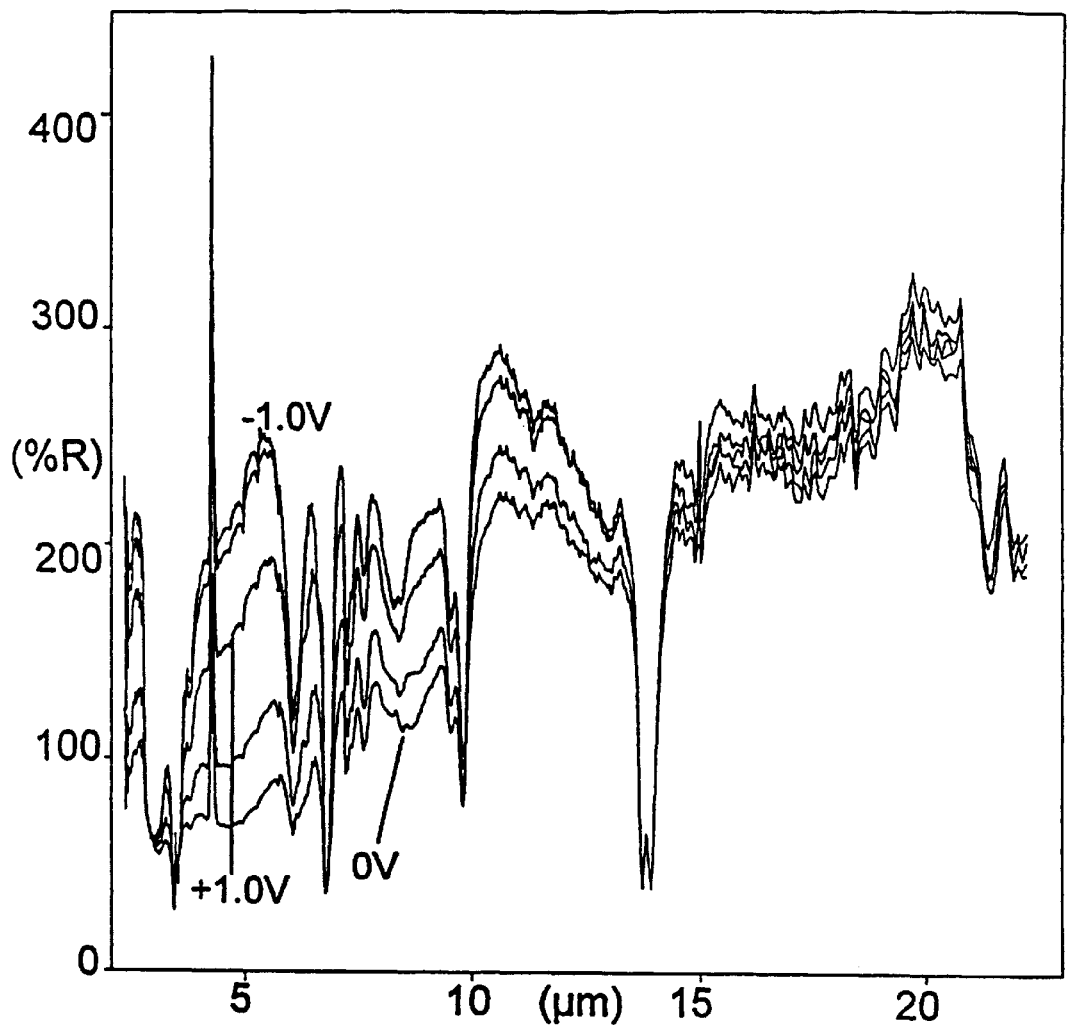
FIG. 8 is a diffuse FTIR spectrum of the electrochromic device of Example 2.
Figure 9:
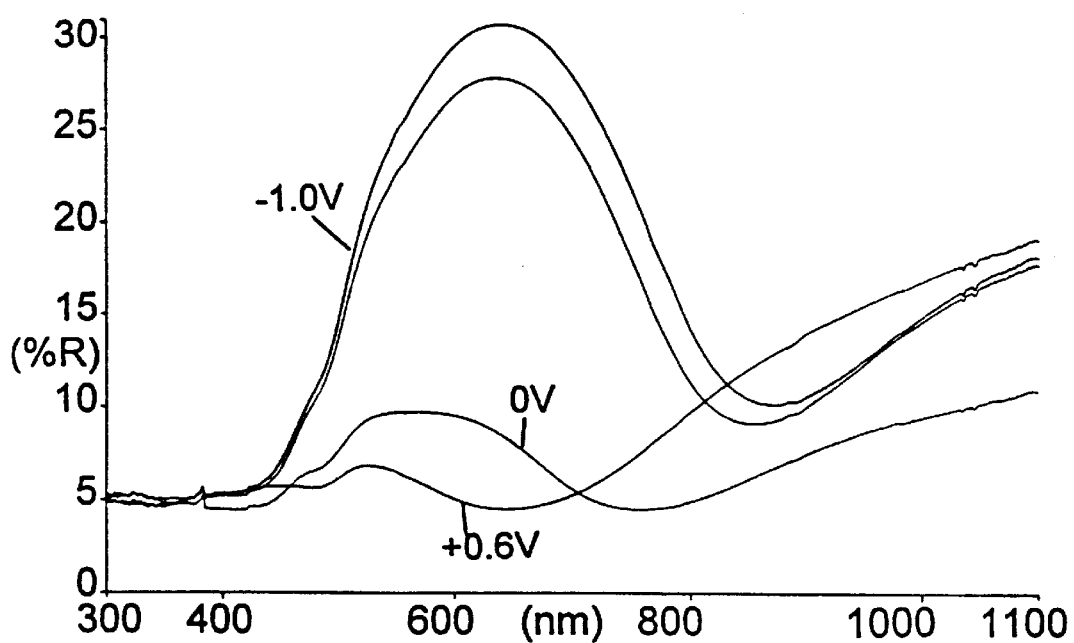
FIG. 9 is a diffuse UV-Visible-NIR spectrum of the electrochromic device of Example 2.

FIGS. 7, 8 and 9 are specular FTIR, diffuse FTIR and diffuse UV-Vis-NIR spectra, respectively, of the device. The observed dynamic range of the device in the infrared region was very substantial. The color changes of the device in Example 2 in the visible region were identical to the color changes exhibited by the device in Example 1.

EXAMPLE 3

The device was substantially identical to the device in Example 1, except that a thin coating of poly(ethyl methacrylate) was applied to the exposed conducting polymer surface of the working electrode in lieu of poly (ethylene). The substrate of the working electrode was composed of nylon in lieu of poly(vinylidene fluoride). The encapsulant coating solution was a 5 w/w % solution of poly(ethyl methacrylate) in toluene. The encapsulant coating solution was prepared by heating the ingredients with stirring until the poly(ethyl methacrylate) dissolved and filtering the resulting solution. The coating was applied manually with an applicator to form an even, thin film surrounding the device.

Figure 10:
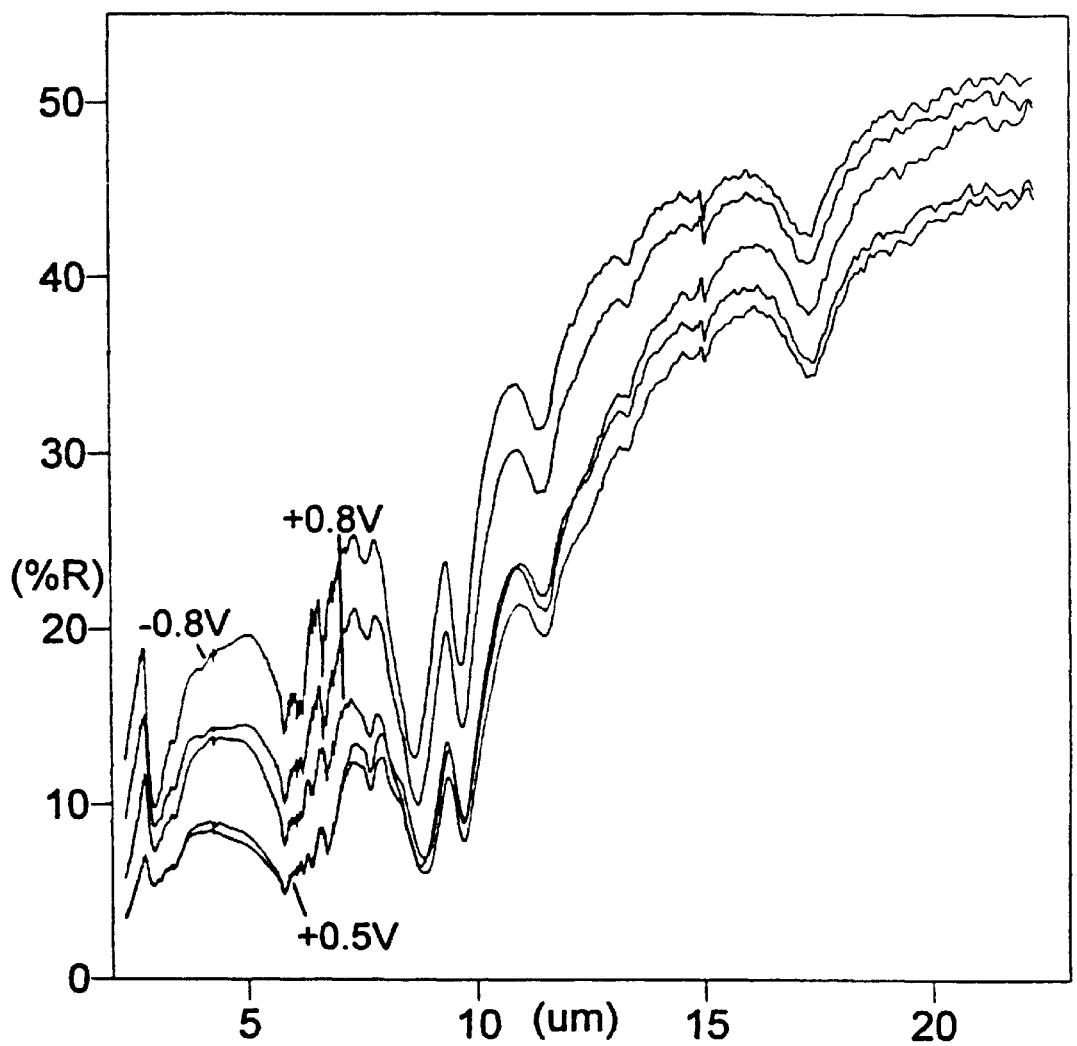
FIG. 10 is a specular FTIR spectrum of the electrochromic device of Example 3.
Figure 11:
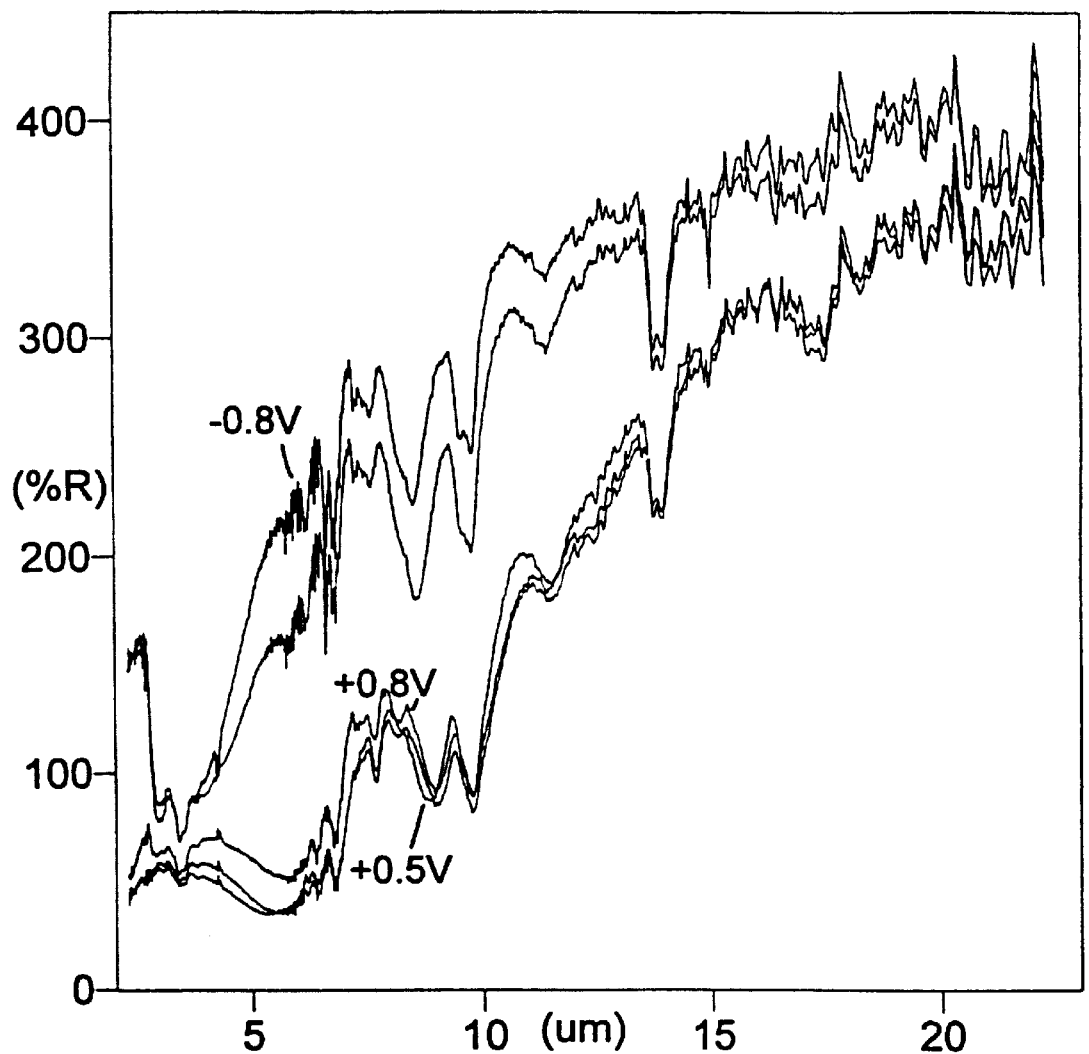
FIG. 11 is a diffuse FTIR spectrum of the electrochromic device of Example 3.
Figure 12:
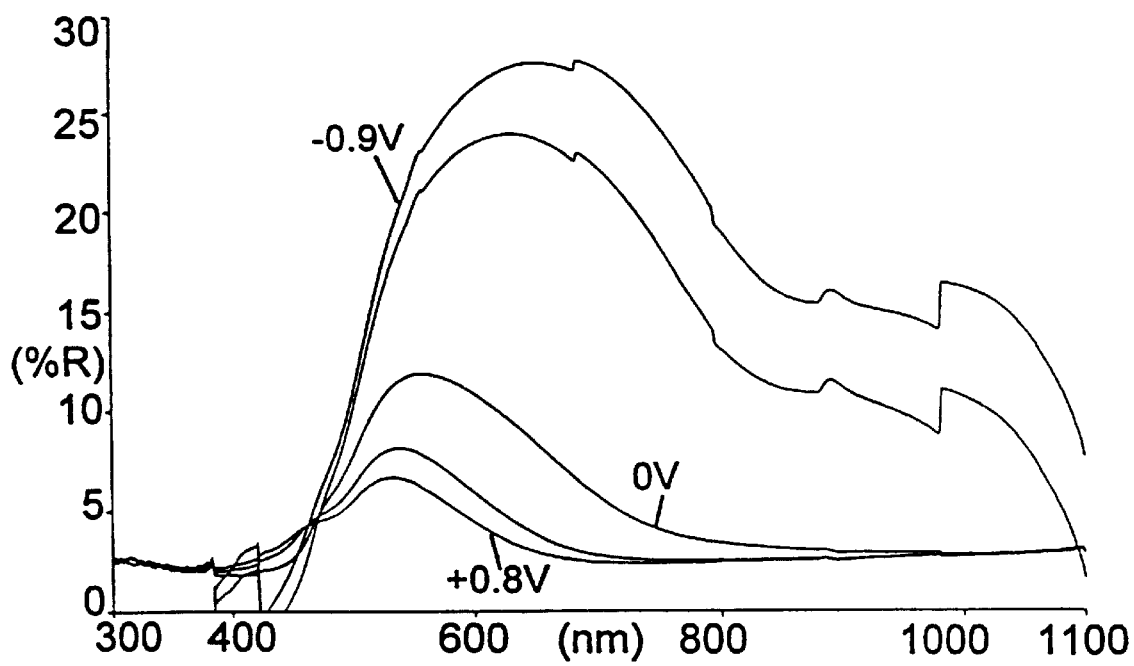
FIG. 12 is a diffuse UV-Visible-NIR spectrum of the electrochromic device of Example 3.

FIGS. 10, 11 and 12 are specular FTIR, diffuse FTIR and diffuse UV-Vis-NIR spectra, respectively, of the device. Unlike the devices in Examples 1 and 2, the dynamic range of the device in Example 3 is not masked at the wavelengths 7, 9 and 13 μm in the infrared region, since the encapsulant is composed of poly(ethyl methacrylate) instead of poly (ethylene). The dynamic range in the visible and infrared regions of the device in Example 3 is also substantially larger than the dynamic ranges of the devices in Examples 1 and 2.

EXAMPLE 4

The device was substantially identical to the device in Example 2, except that the electropolymerization solution comprised 0.2M $H_2SO_4$ and 0.2M salt of poly (anethosulfonate) in deionized water. The electrolyte solution before heating comprised 0.02M $H_2SO_4$ and 0.2M poly(anethosulfonate) in deionized water.

Figure 13:
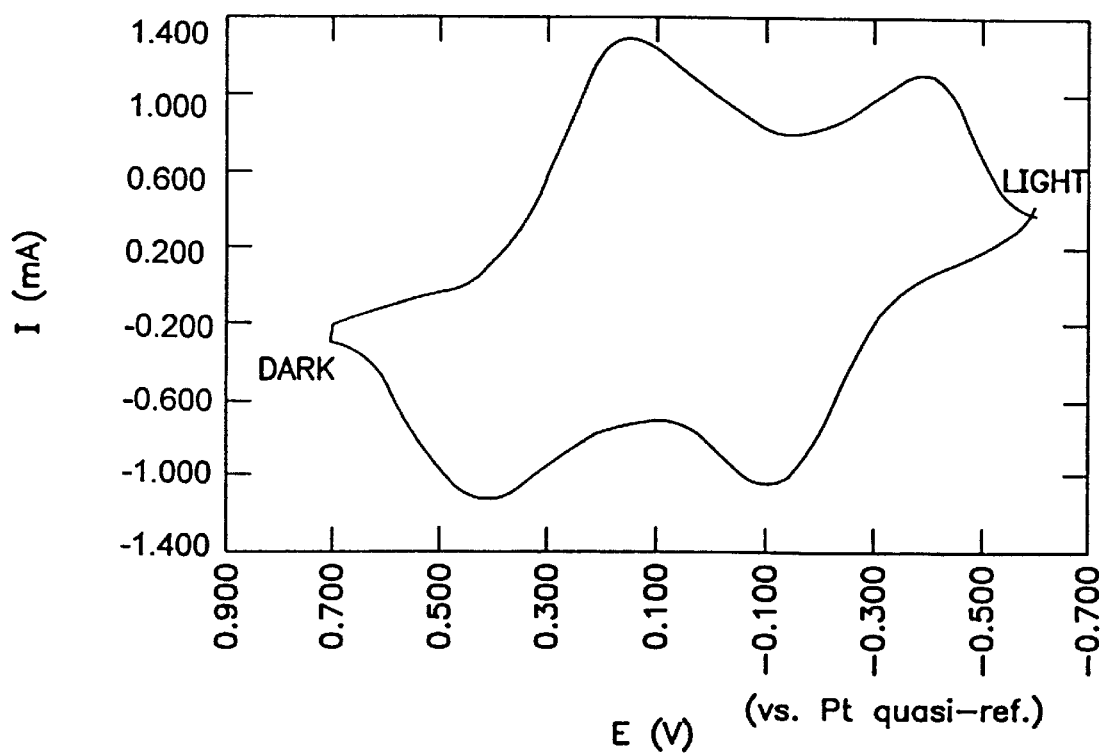
FIG. 13 is a cyclic voltammogram of the electrochromic device of Example 4.
Figure 14:
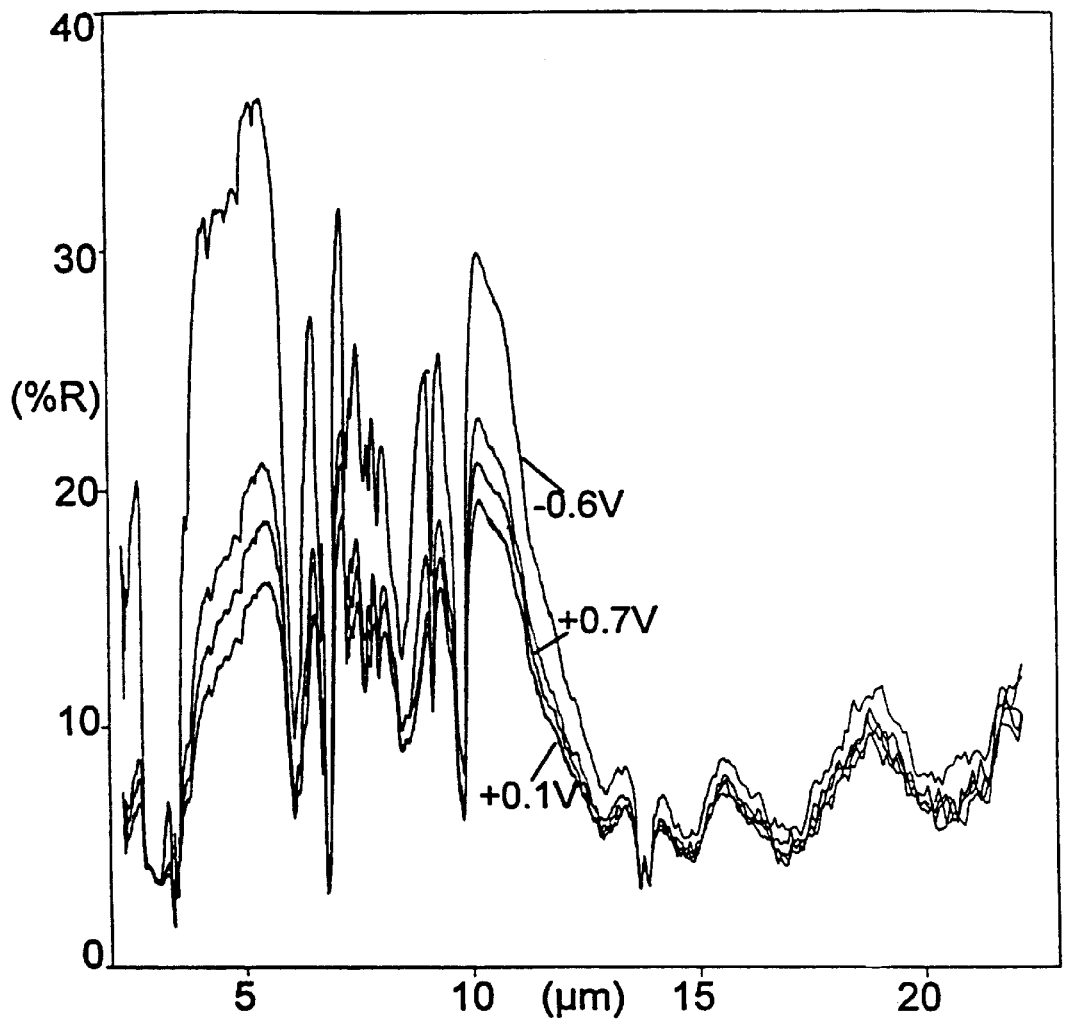
FIG. 14 is a specular FTIR spectrum of the electrochromic device of Example 4.
Figure 15:
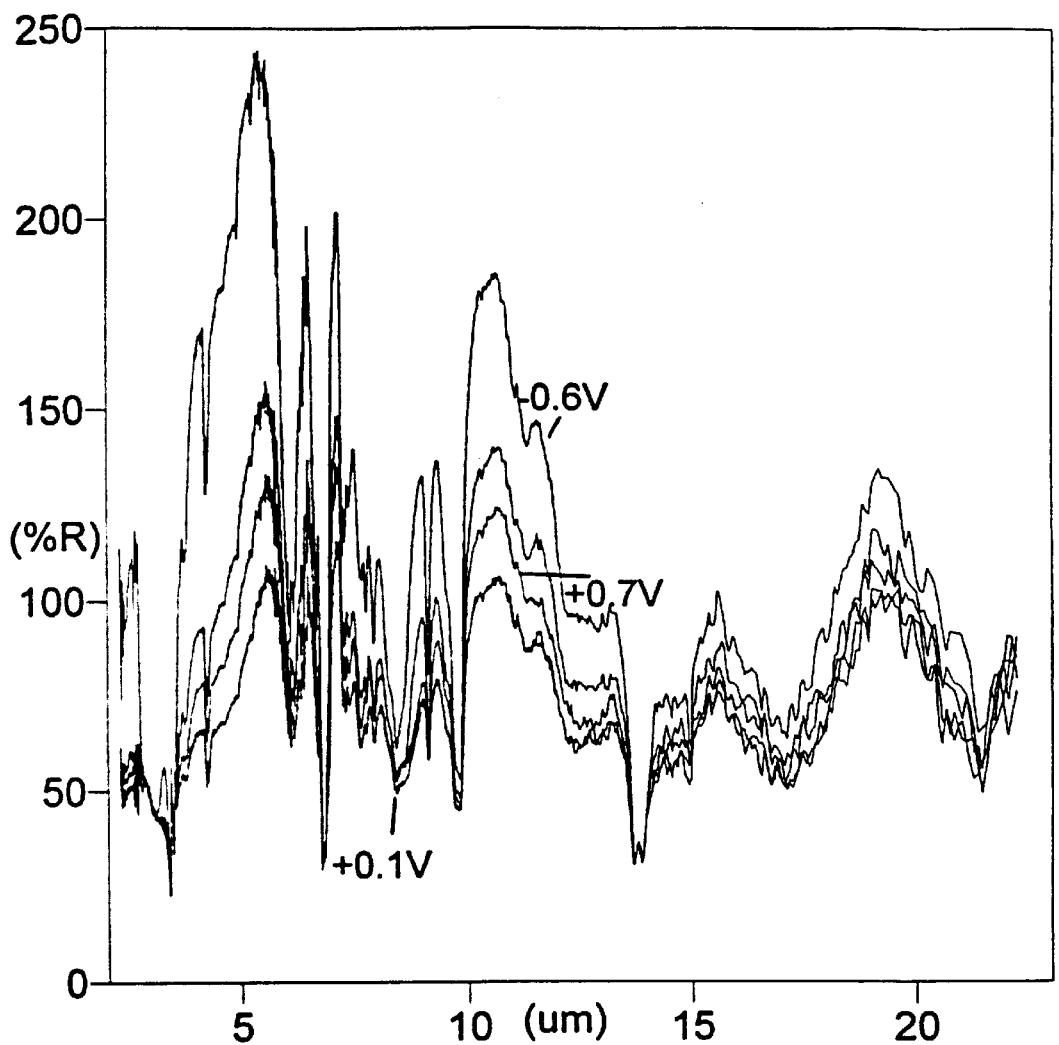
FIG. 15 is a diffuse FTIR spectrum of the electrochromic device of Example 4.
Figure 16:
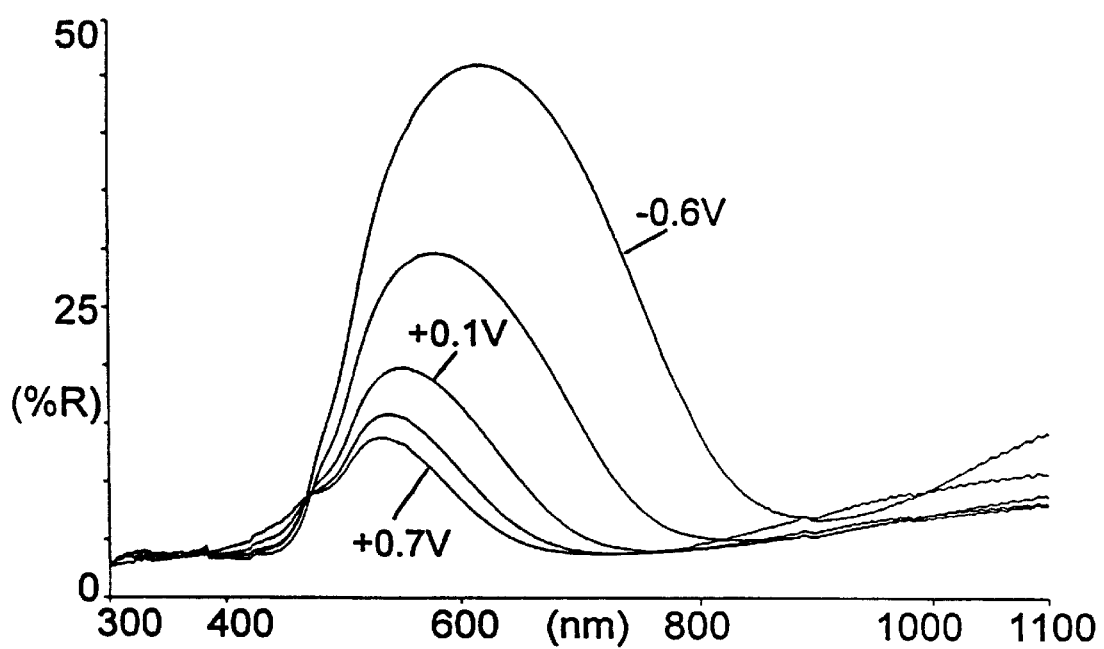
FIG. 16 is a specular UV-Visible-NIR spectrum of the electrochromic device of Example 4.

FIG. 13 is the characterization cyclic voltammogram for this device. Two peaks are observed in the characterization cyclic voltammogram. These peaks are characteristic of most poly(aromatic amines). In FIGS. 14, 15 and 16, specular FTIR, diffuse FTIR and specular UV-Visible-NIR spectra, respectively, of the device are shown.

Examples 5–8 are comparative examples illustrating the significant and dramatic improvements of the present invention over the prior art.

COMPARATIVE EXAMPLE 5

The device in Example 5 was substantially identical to the device in Example 2, except that, as in U.S. Pat. No. 5,446,577, issued to Bennett et al., a layer of electrolyte was inserted between the conducting polymer surface of the working electrode and the encapsulant.

Figure 17:
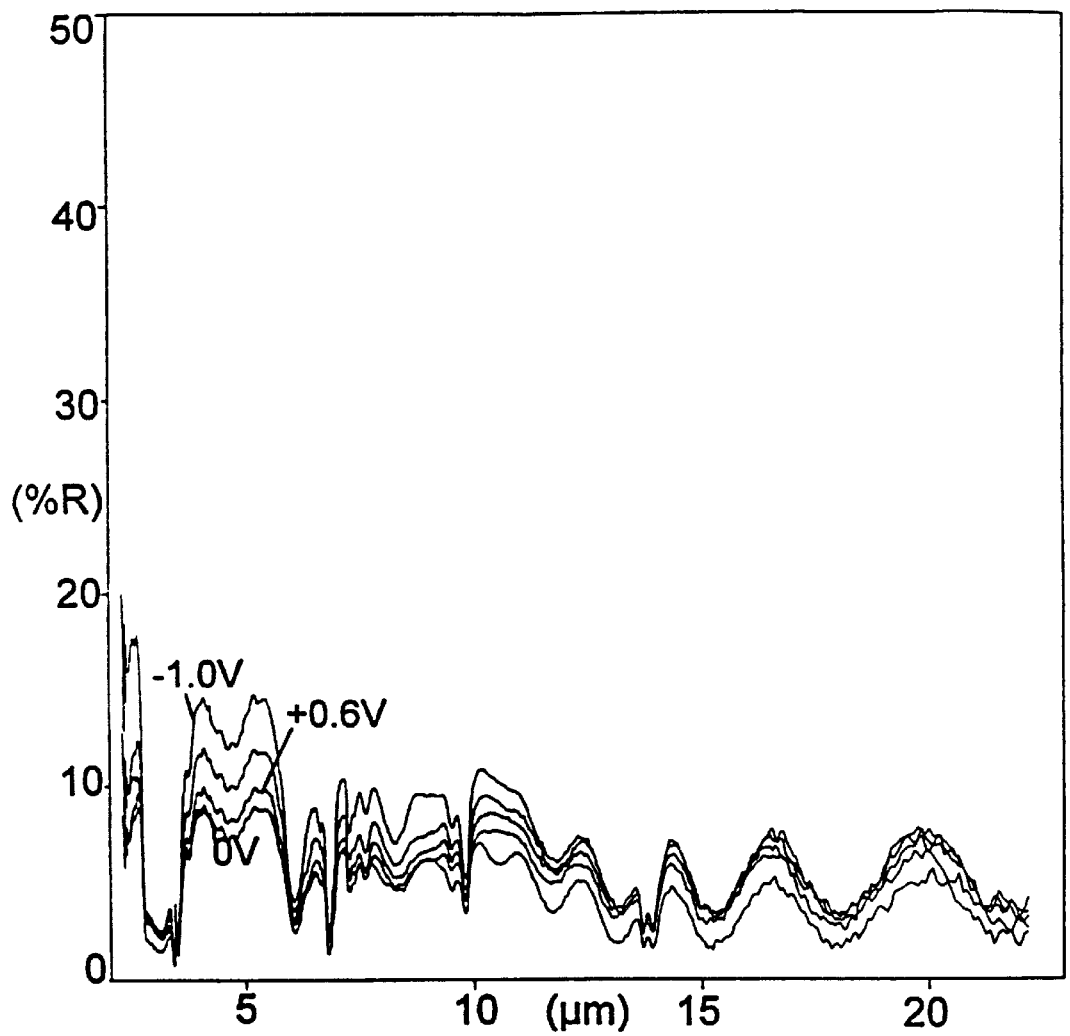
FIG. 17 is a specular FTIR spectrum of the electrochromic device of Comparative Example 5.
Figure 18:
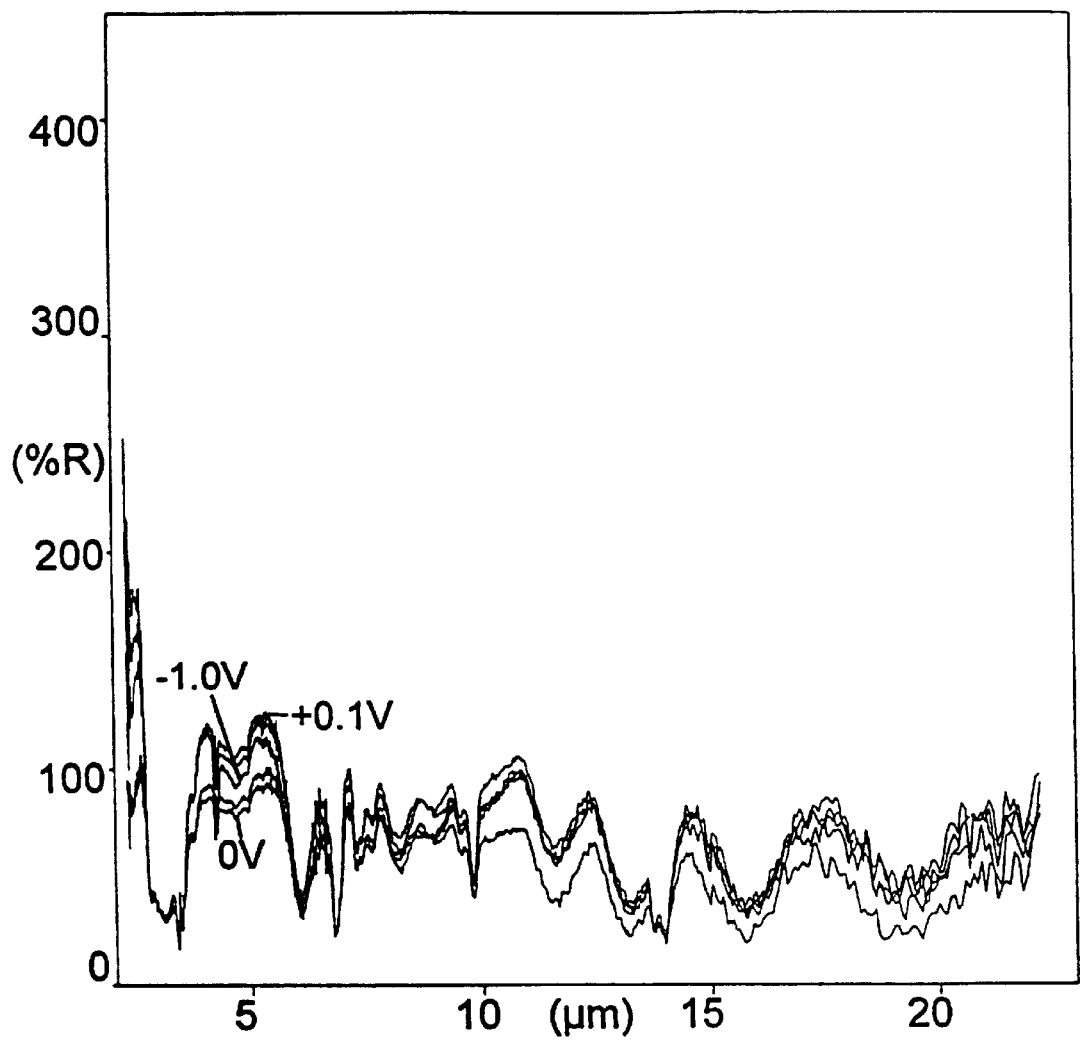
FIG. 18 is a diffuse FTIR spectrum of the electrochromic device of Comparative Example 5.

FIGS. 17 and 18 are specular FTIR and diffuse FTIR spectra, respectively, of the device. Comparison of FIGS. 17 and 18 with FIGS. 7 and 8 of the device in Example 2 illustrates the dramatic decrease in dynamic range in the infrared region when a layer of electrolyte is inserted between the working electrode and the encapsulant, especially in the regions 3 to 5 μm and 8 to 14 μm.

COMPARATIVE EXAMPLE 6

The device was substantially identical to the device in Example 2, except that the conducting polymer/dopant combination in the device in was Poly(pyrrole)/$ClO_4$. The electropolymerization solution comprised 0.05M pyrrole monomer, 0.2M $ClO_4$, and acetonitrile. The electrochemical polymerization of the electrodes was performed with the potentials of +0.6V and +0.5V (double step, vs. Pt quasi-reference) instead of +0.8V and +0.6V. The thickness of the conducting polymer/dopant film was selected to correspond to that of the poly(aniline) film in Example 2. Variations in the thickness of the conducting polymer/dopant film were tested and had negligible effect on the dynamic range of the device. Each electrode was washed in acetonitrile and dried before the device was assembled.

Figure 19:
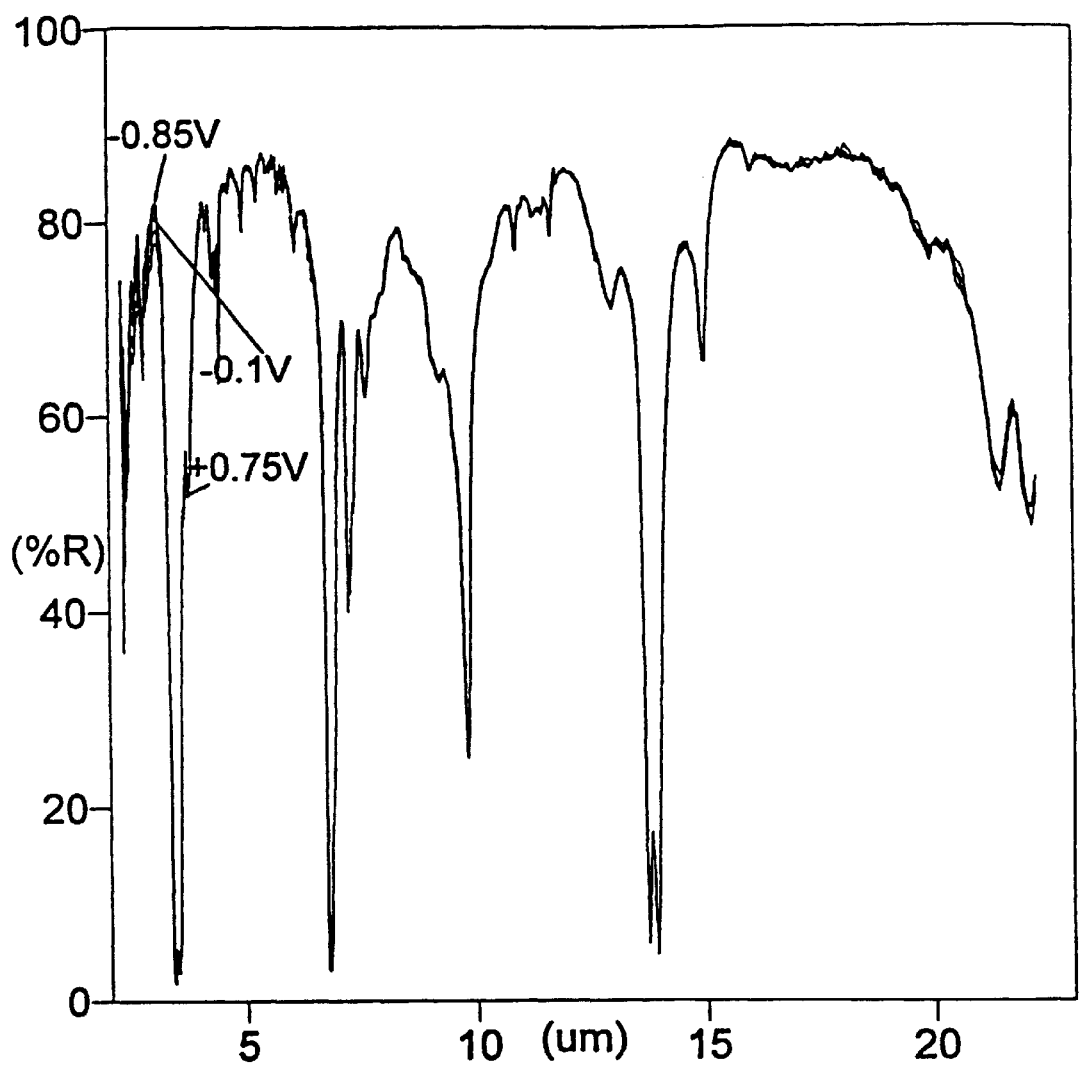
FIG. 19 is a specular FTIR spectrum of the electrochromic device of Comparative Example 6.
Figure 20:
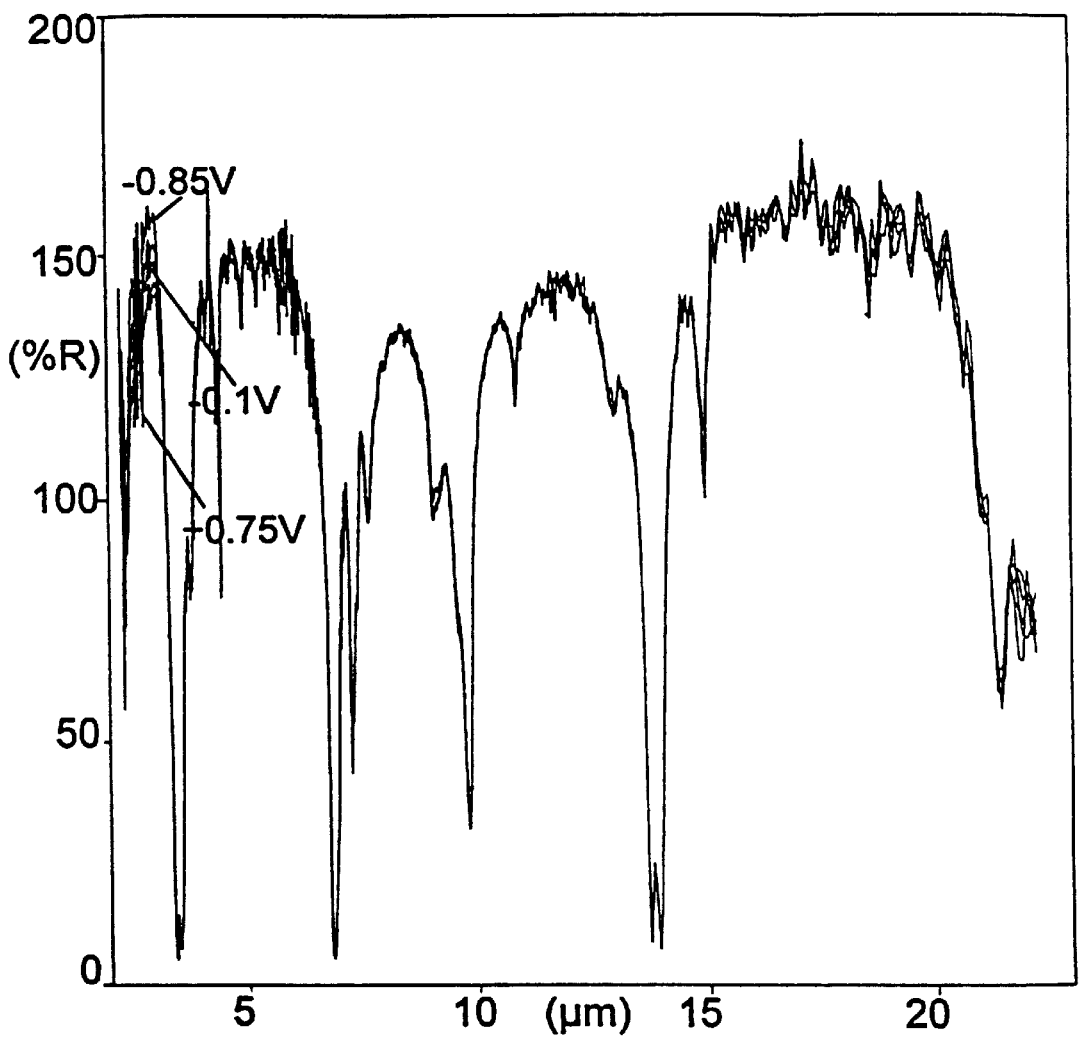
FIG. 20 is a diffuse FTIR spectrum of the electrochromic device of Comparative Example 6.

FIGS. 19 and 20 are specular FTIR and diffuse FTIR spectra of the device. As shown in FIGS. 19 and 20, the dynamic range of the device is negligible. The conducting polymer/dopant combination of this device is almost non-responsive in the infrared region.

COMPARATIVE EXAMPLE 7

The device was substantially identical to the device in Example 6, except that p-toluene sulfonate was used in lieu of $ClO_4$. The conducting polymer electropolymerization was performed at +1.2V and 1.1V (vs. Pt quasi reference) instead of +0.8V and +0.6V.

Figure 21:
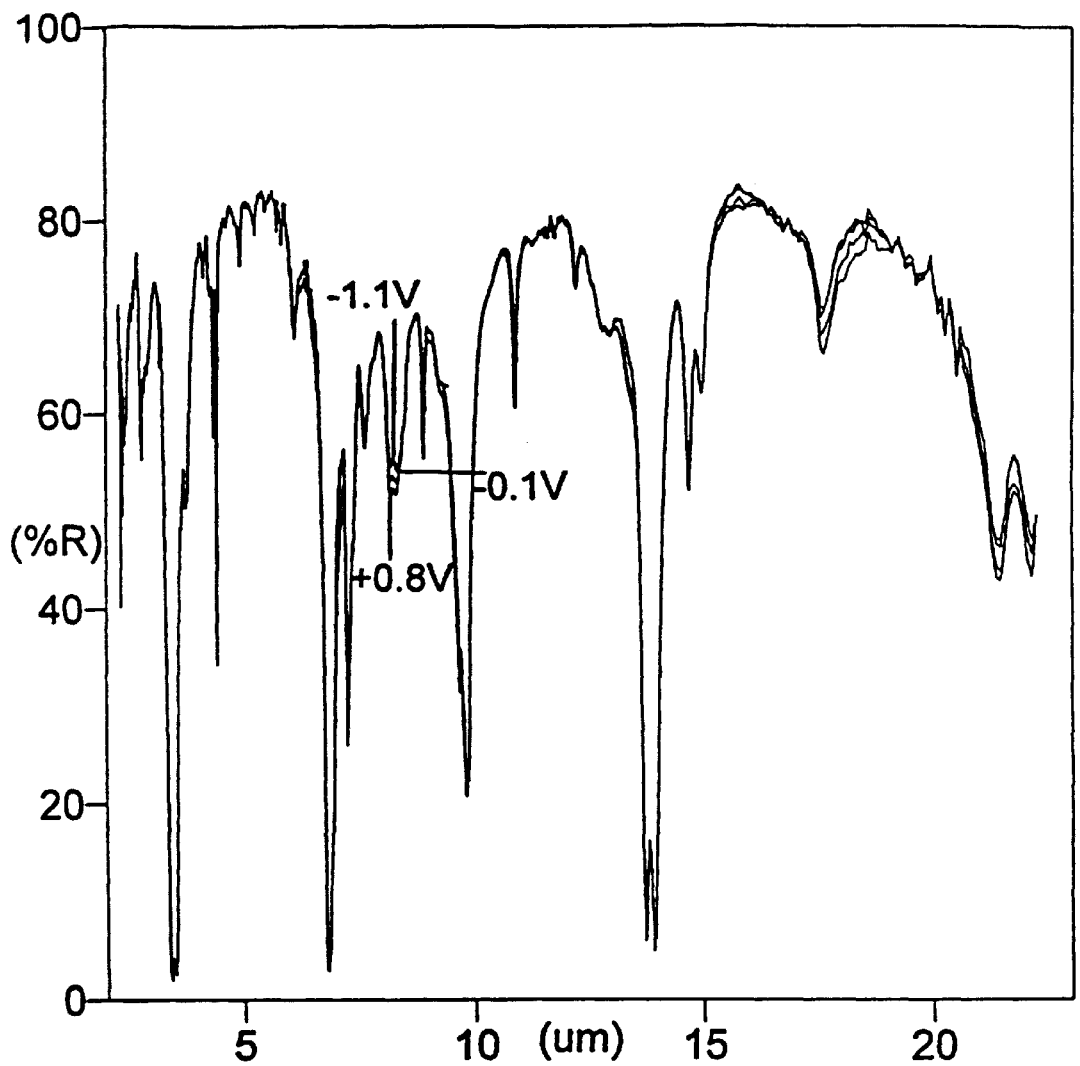
FIG. 21 is a specular FTIR spectrum of the electrochromic device of Comparative Example 7.

FIG. 21 is a specular FTIR spectrum of the device. The device exhibited negligible dynamic range in the infrared region. Varying the dopant in the device negligibly effected the dynamic range of the device in the infrared region. Hence, the conducting polymer was nonresponsive in the infrared region.

COMPARATIVE EXAMPLE 8

The device was substantially identical to the device in Example 2, except that the electropolymerization solution comprised 0.2M $H_2SO_4$.

Figure 22:
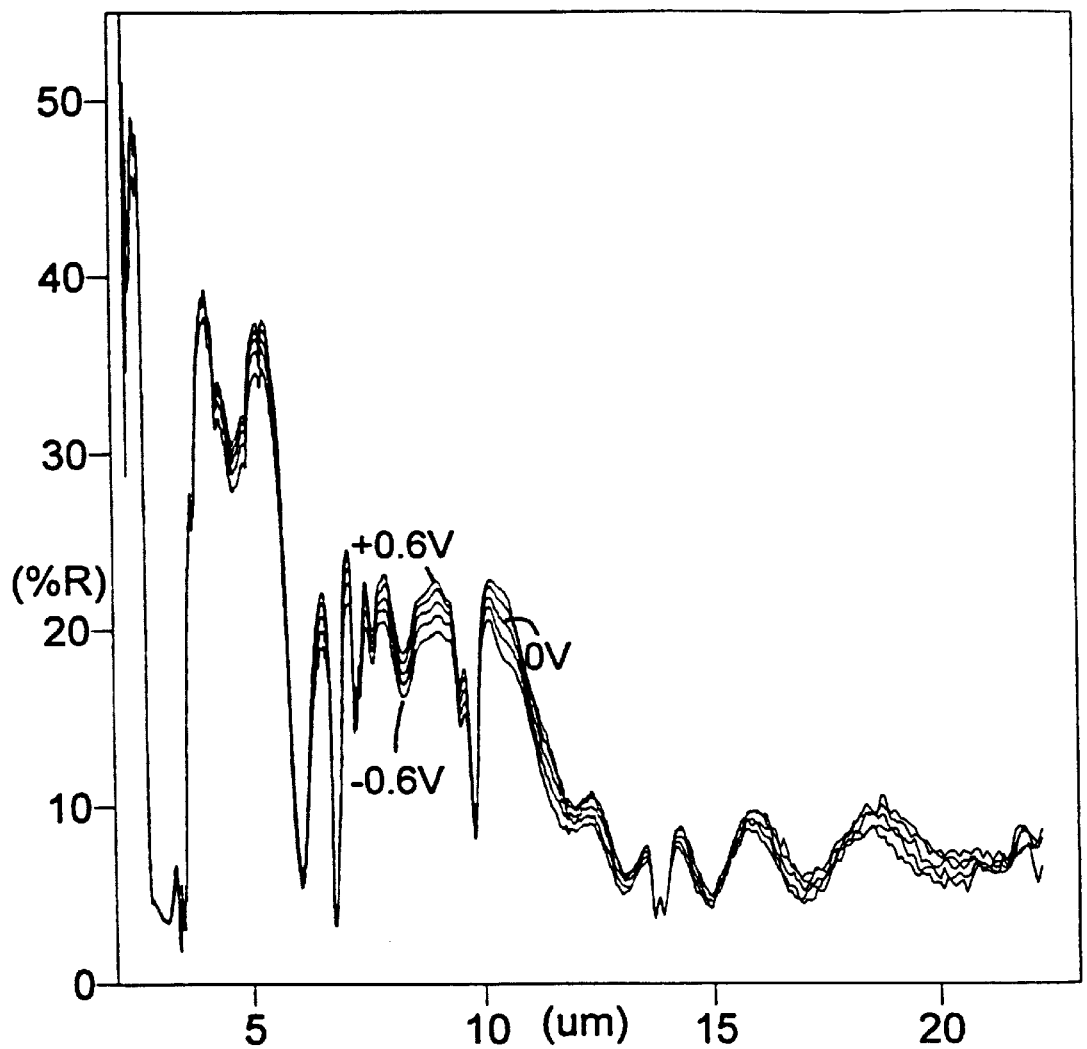
FIG. 22 is a specular FTIR spectrum of the electrochromic device of Comparative Example 8.
Figure 23:
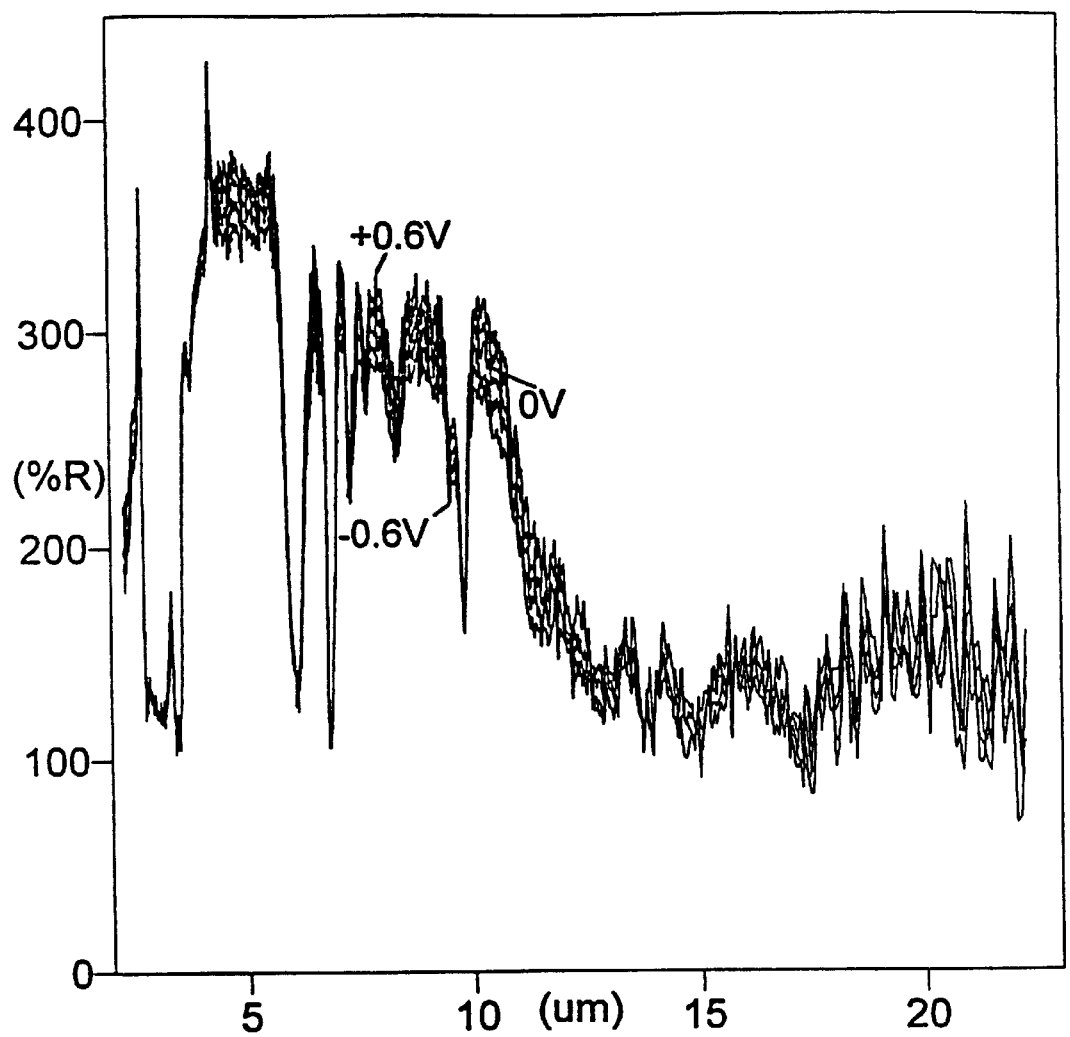
FIG. 23 is a diffuse FTIR spectrum of the electrochromic device of Comparative Example 8.
Figure 24:
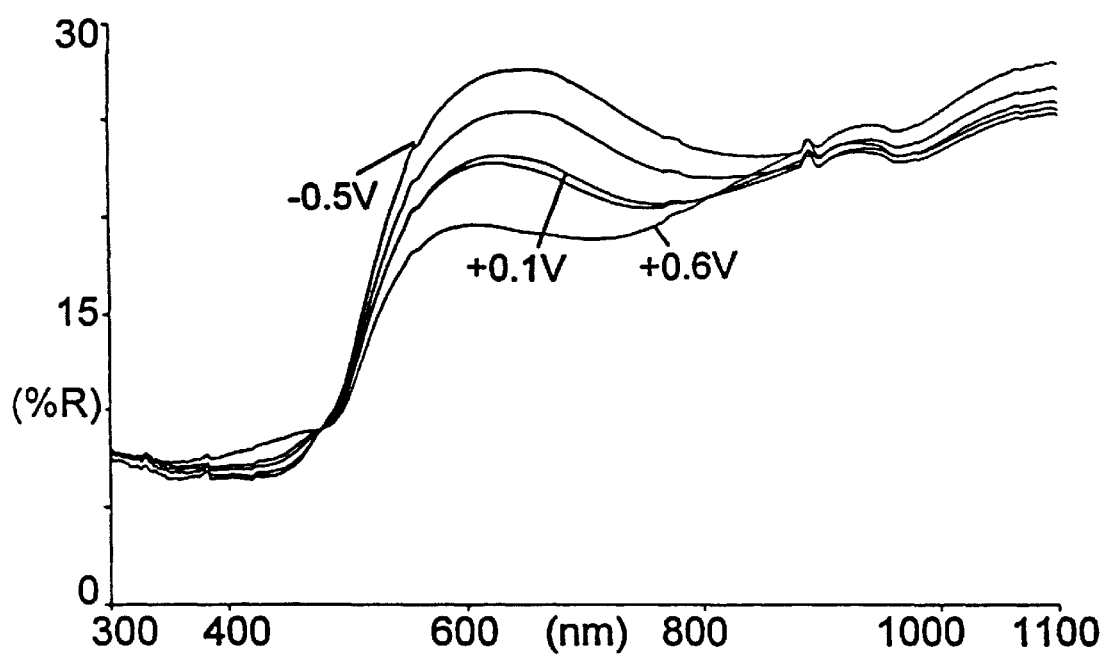
FIG. 24 is a diffuse UV-Visible-NIR spectrum of the electrochromic device of Comparative Example 8.

FIGS. 22, 23 and 24 are specular FTIR, diffuse FTIR and diffuse UV-Visible-NIR spectras, respectively, of the device. The device exhibited poor dynamic range.

COMPARATIVE EXAMPLE 9

The device in Comparative Example 9 was substantially identical to the device in Example 2, except that the electropolymerization solution comprised poly(styrene sulfonate) as a Na salt. The conducting polymer/dopant combination was poly(aniline)/ poly(styrene sulfonate), which was identical to that used in U.S. Pat. No. 5,253,100, issued to Yang et al.

Figure 25:
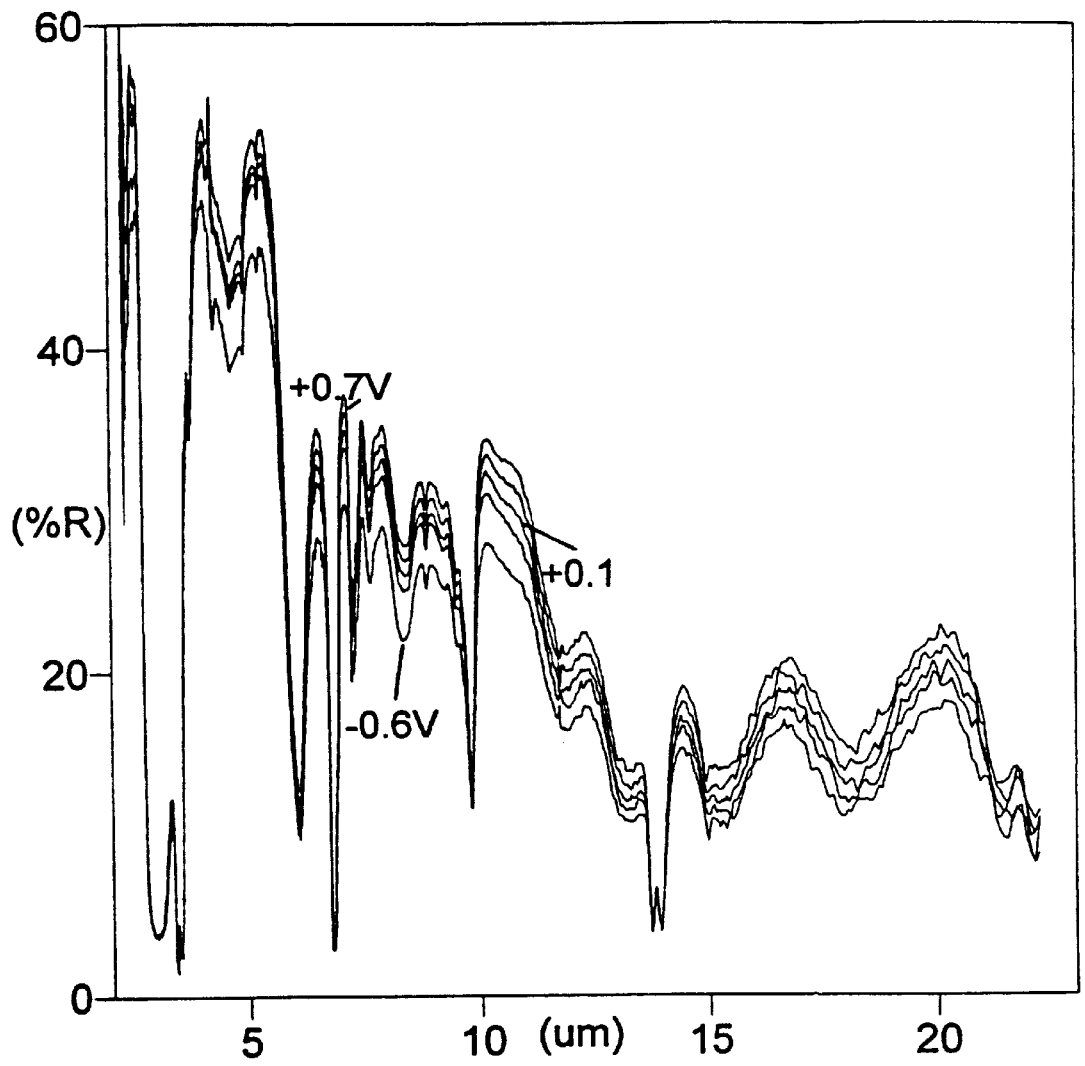
FIG. 25 is a specular FTIR spectrum of the electrochromic device of Comparative Example 9.
Figure 26:
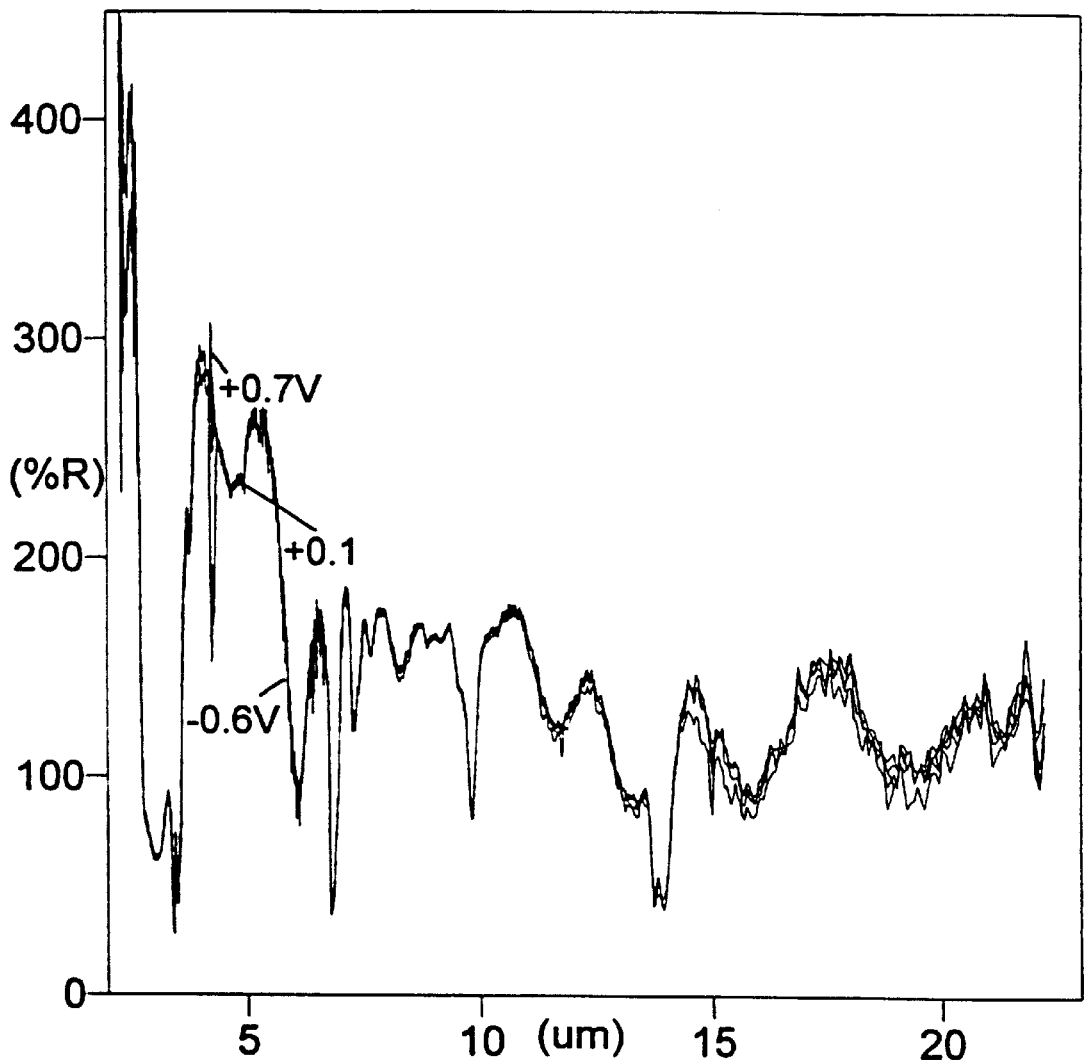
FIG. 26 is a diffuse FTIR spectrum of the electrochromic device of Comparative Example 9.
Figure 27:
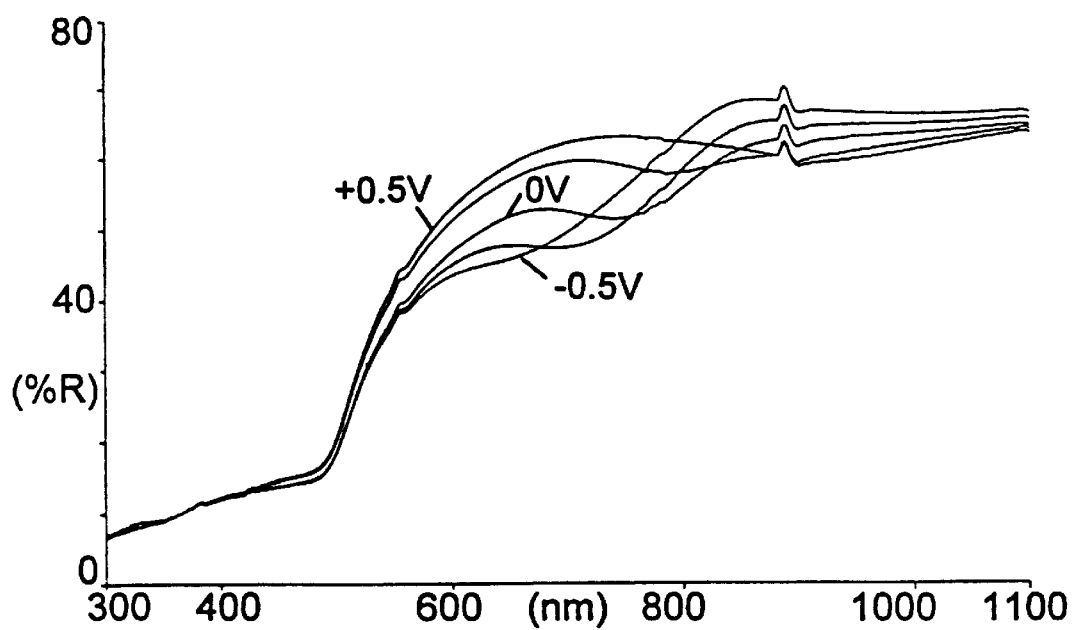
FIG. 27 is a specular UV-Visible-NIR spectrum of the electrochromic device of Comparative Example 9.

FIGS. 25, 26 and 27 are specular FTIR, diffuse FTIR and specular UV-Visible-NIR spectra, respectively, of the device. The device did not contain any of the aforementioned preferred dopants. The infrared response of the device was very poor, as shown by FIGS. 25, 26 and 27. Hence, the dopant is critical to the infrared response of the device.

Figure 28:
FIG. 28 is a bar graph comparing the diffuse reflectance dynamic ranges at 5 μm of the electrochromic devices of Examples 2, 6, 7, 8 and 9.

FIG. 28 is a bar graph comparing the diffuse reflectance dynamic ranges at 5$\mu$m of the devices in Example 2 and Comparative Examples 5, 6, 8 and 9. FIG. 28 illustrates that both the device design and the conducting polymer/dopant combination are critical determinants of the infrared response and dynamic range of the electrochromic device.

EXAMPLE 10

The device in Example 10 was substantially identical to the device in Example 1, except that a solid electrolyte was used in lieu of the liquid electrolyte.

The solid electrolyte was prepared by mixing a solution comprising 0.005M poly(anethosulfonate), 0.25M poly (vinyl sulfate), 0.2M $H_2SO_4$, and 4.36M poly(vinyl alcohol) (Avg MWt 186,000) in 25 mL deionized water. The solution was heated to just boiling until the contents of the solution dissolved. The volume of the solution was reduced to 90% of its original volume. Then, the solution was cooled. The solid electrolyte was reheated until it became fluid. The heated solid electrolyte was poured into the fill hole of the device. The fill hole was finally heat sealed after letting the device rest unsealed for 3 days.

Figure 29:
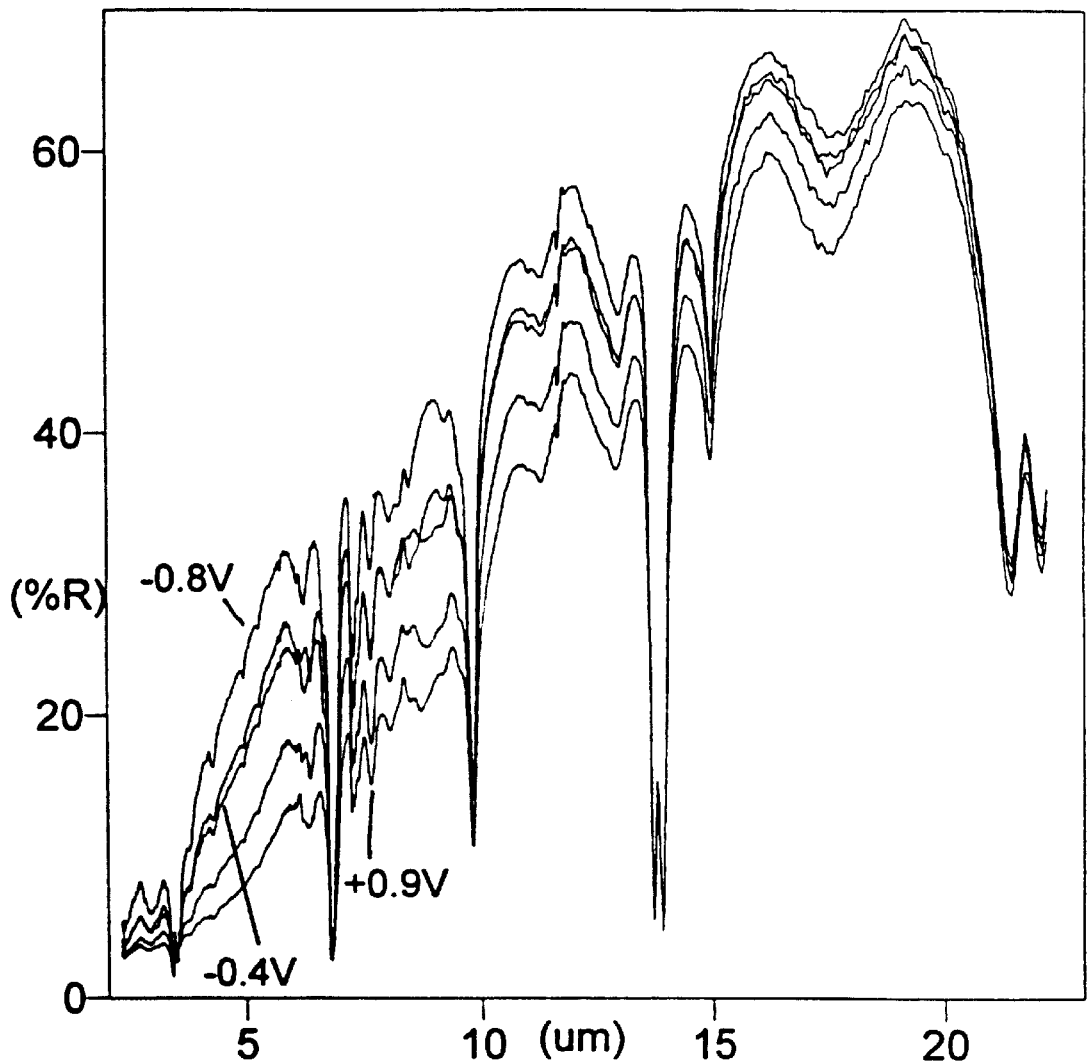
FIG. 29 is a specular FTIR spectrum of the electrochromic device of Example 10.
Figure 30:
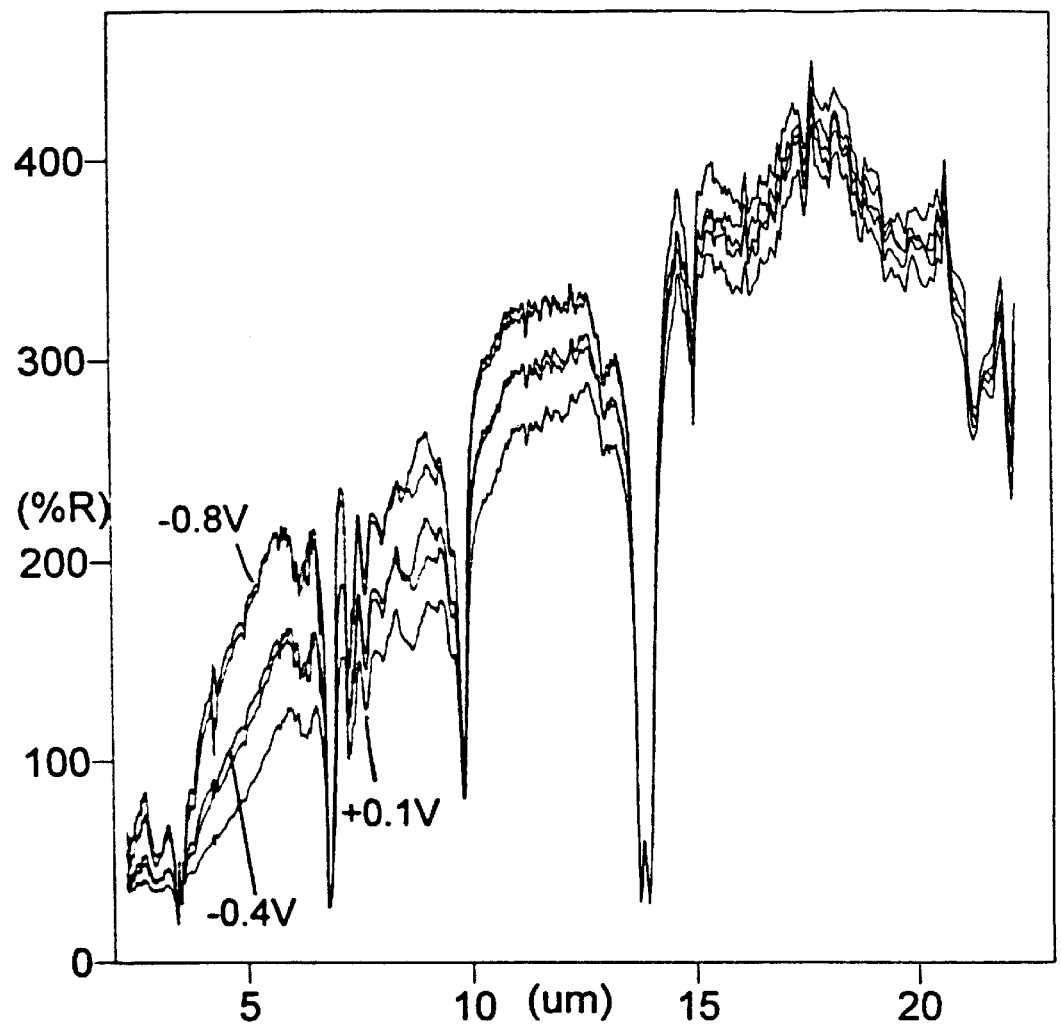
FIG. 30 is a diffuse FTIR spectrum of the electrochromic device of Example 10.

FIGS. 29 and 30 are specular FTIR and diffuse FTIR spectra, respectively, of the device. The poly(ethylene) encapsulant absorptions at the wavelengths 7, 9 and 13 $\mu$m somewhat mask the otherwise very substantial, broad band dynamic range of the device in FIGS. 29 and 30.

EXAMPLE 11

The device in Example 11 was substantially identical to the device in Example 2, except that the solid electrolyte described in Example 10 was incorporated in the device in lieu of the liquid electrolyte in Example 2. The electrochemical polymerization solution comprised 0.2M $H_2SO_4$, 0.4M K salt of poly(vinyl sulfate), 0.005M salt of poly (anethosulfonate) and 0.05M aniline.

Figure 31:
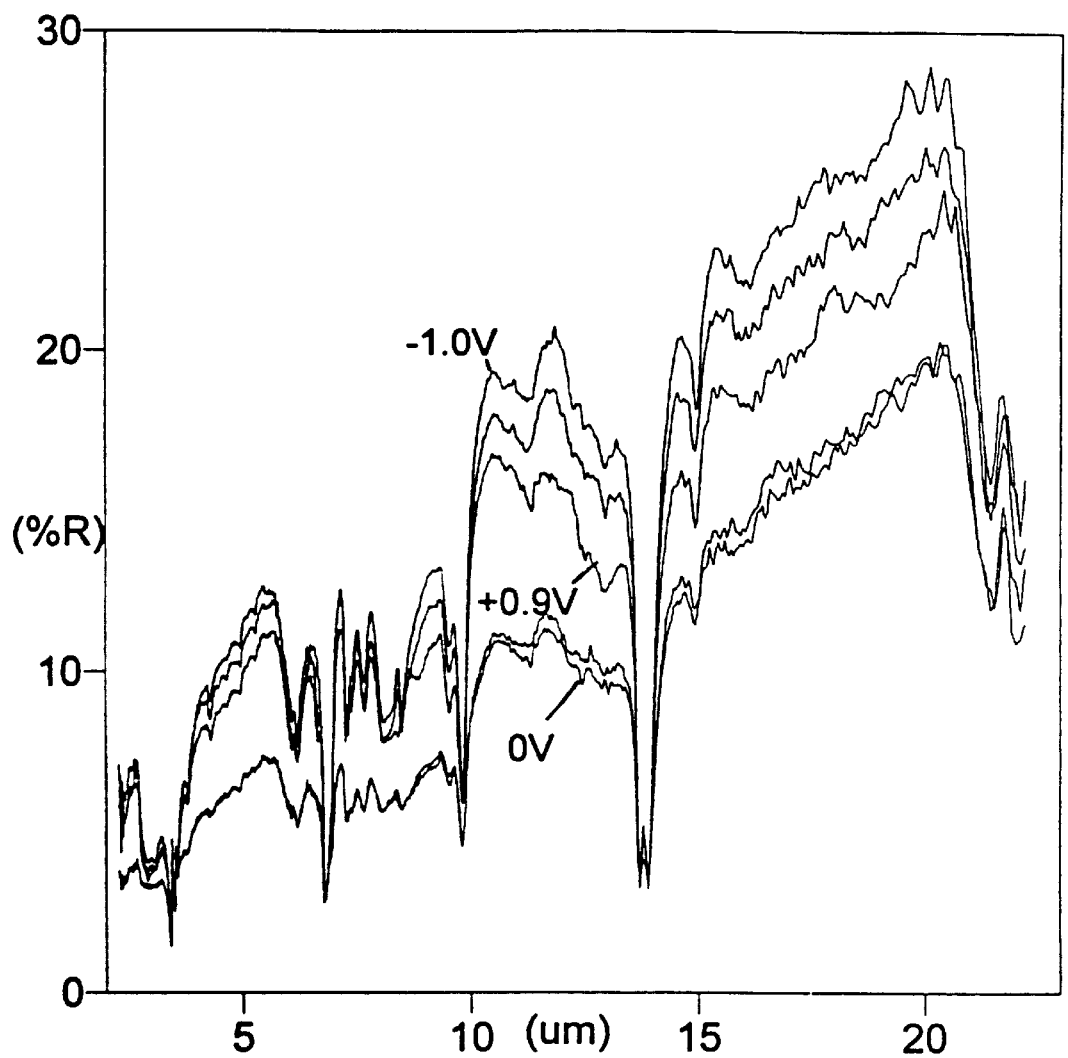
FIG. 31 is a specular FTIR spectrum of the electrochromic device of Example 11.
Figure 32:
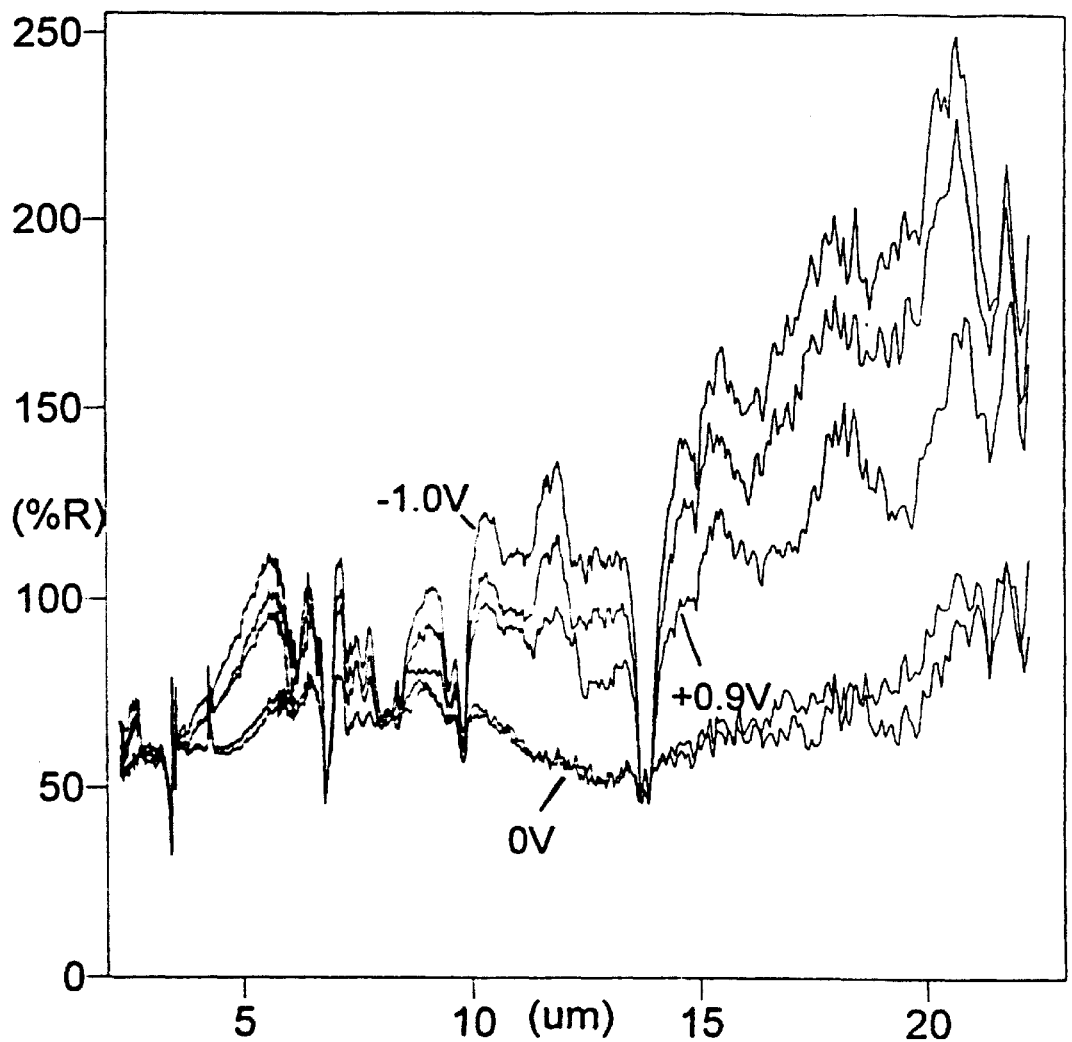
FIG. 32 is a diffuse FTIR spectrum of the electrochromic device of Example 11.
Figure 33:
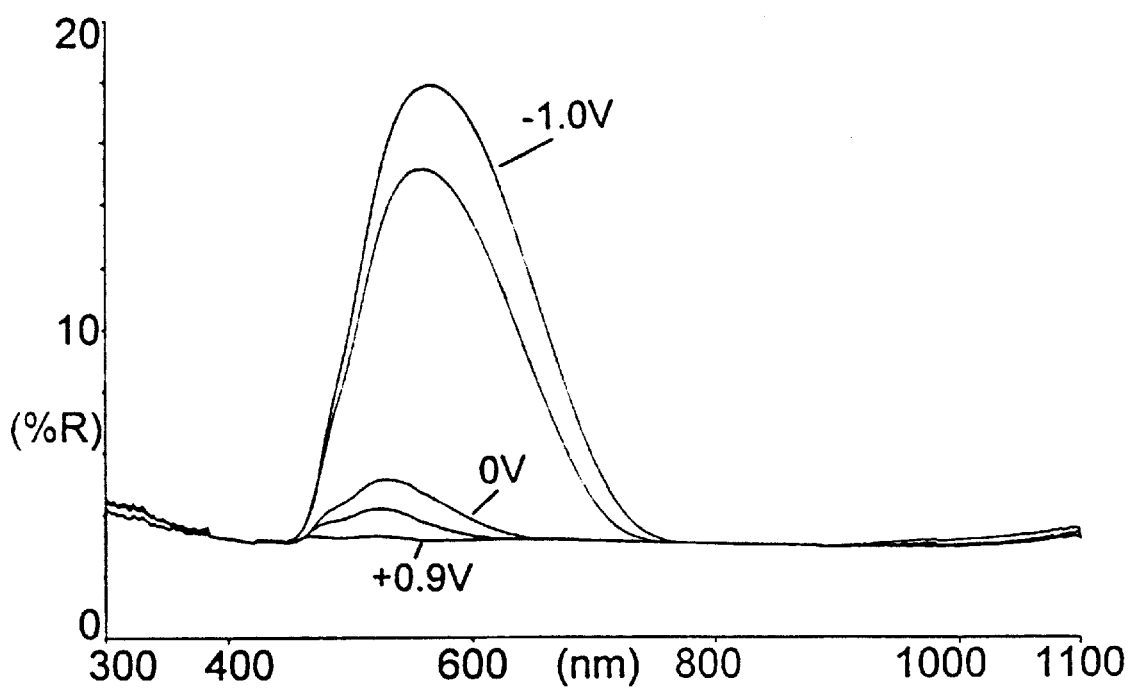
FIG. 33 is a diffuse UV-Visible-NIR spectrum of the electrochromic device of Example 11.

FIGS. 31, 32 and 33 are specular FTIR, diffuse FTIR, and diffuse UV-Visible-NIR spectras, respectively, of the device. As shown by FIGS. 31, 32 and 33, substantial tailoring of the infrared response of the device can be achieved by altering the conditions during electropolymerization. The dynamic ranges of the device in the infrared, visible, and ultraviolet regions are especially large. The dynamic range is especially large and broad band in the extreme long wave infrared region 10 to 20 $\mu$m. The poly(ethylene) encapsulant masks the dynamic range of the device at 13 $\mu$m.

EXAMPLE 12

The device was substantially identical to the device in Example 2, except that poly(3-methyl thiophene) doped with a fluorinated anionic dopant was used in lieu of poly(aniline). The conducting polymer electropolymerization was performed at +1.05V and +0.9V (vs. Pt quasi-reference) a instead of +0.8V and +0.6V. The electropolymerization solution was an acetonitrile solution of 0.05M monomer and 0.2M fluorinated dopant. The electrodes were washed with acetonitrile before use.

Figure 34:
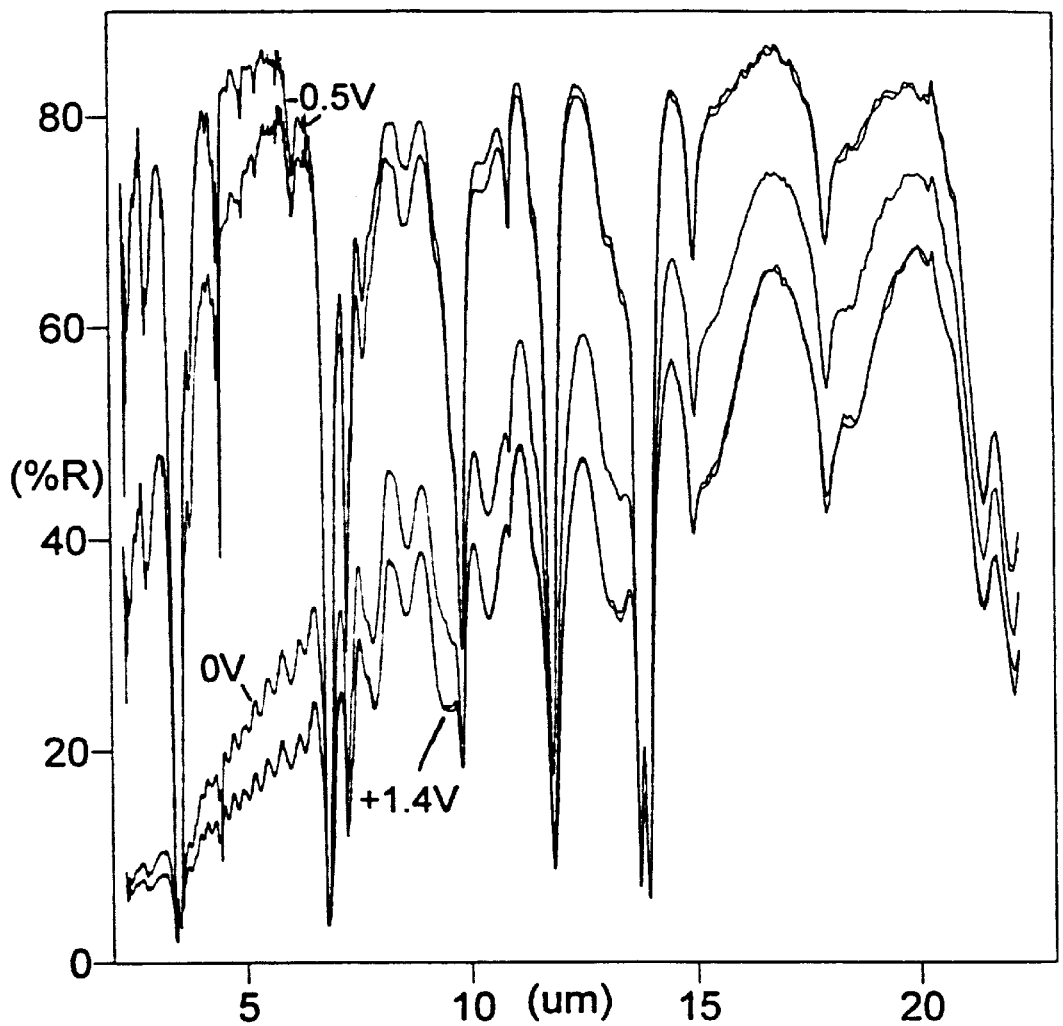
FIG. 34 is a specular FTIR spectrum of the electrochromic device of Example 12.
Figure 35:
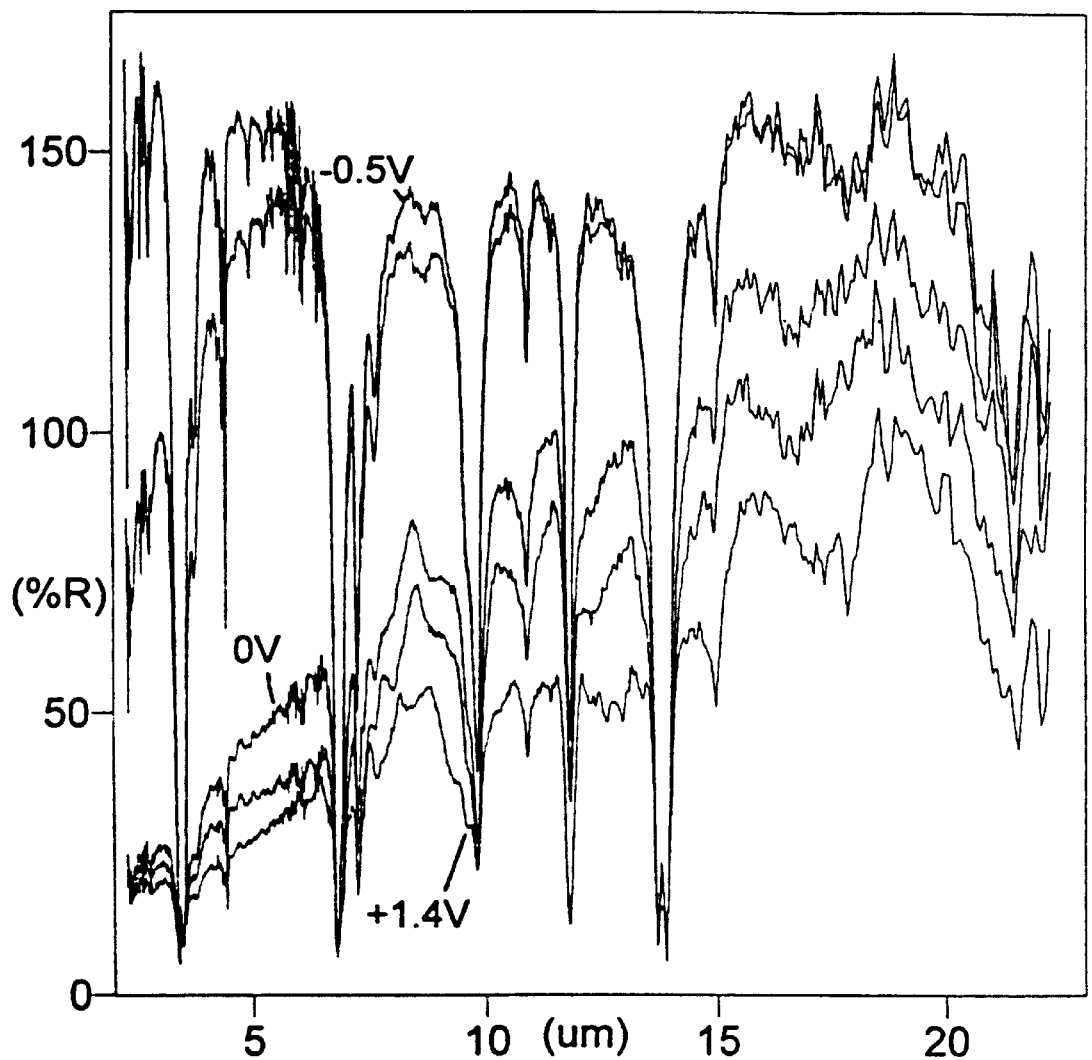
FIG. 35 is a diffuse FTIR spectrum of the electrochromic device of Example 12.
Figure 36:
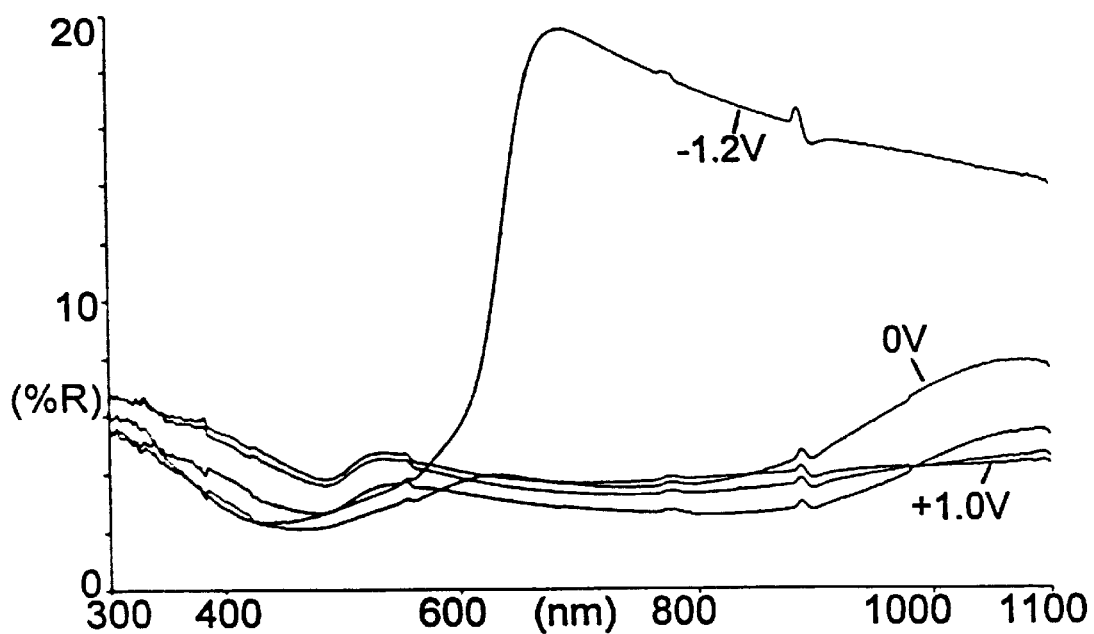
FIG. 36 is a diffuse UV-Visible-NIR spectrum of the electrochromic device of Example 12.

FIGS. 34, 35 and 36 are specular FTIR, diffuse FTIR, and diffuse UV-Visible-NIR spectras, respectively, of the device. The device exhibited broad band and large dynamic range in the infrared region as shown in FIGS. 34, 35 and 36. The poly(ethylene) encapsulant partially masks the dynamic range of the device in the infrared region. This device, however, exhibits a smaller dynamic range in the visible region, as shown in FIG. 36, than the device in Example 2. The device in Example 12 does not exhibit the glass clear transparency in the visible region, when the conducting polymer is in the most reduced state which is characteristic of poly(aromatic amines).

EXAMPLE 13

The device in Example 13 was substantially identical to the device in Example 2, except that the conducting polymer/dopant combination was poly(diphenyl amine) /p-toluene sulfonate instead of poly(aniline). The electropolymerization solution was an acetonitrile solution of 0.05M poly(diphenyl amine) monomer and 0.2M p-toluene sulfonate dopant. The electropolymerization was performed at the potentials +1.2V (vs. Pt quasi-reference) and +1.1V instead of +0.8V and +0.6V. The electrodes were washed with acetonitrile and dried prior to assembly of the device.

The electrolyte was a solid electrolyte instead of a liquid electrolyte. The solid electrolyte was prepared by mixing a solution containing 0.76M of poly(ethylene oxide), 0.086M of poly(ethylene glycol) (Avg MWt 1,500), 0.005M of p-toluene sulfonate, 0.15M trifluoromethane sulfonate, 0.003M of poly(vinyl sulfate), 0.003M of poly (anethosulfonate), and 1 w/w % of the poly(ethyl methacrylate), and 75 mL (1.436 moles) acetonitrile. The average molecular weight of the poly(ethylene oxide) was 600,000 g/mol. The solution was heated with stirring until the ingredients of the solution dissolved. The acetonitrile was then slowly evaporated off on a vacuum line, yielding the solid electrolyte. The electrolyte was then reheated until the electrolyte was molten. The electrolyte was then poured into the fill hole of the device. The fill hole was heat sealed.

Figure 37:
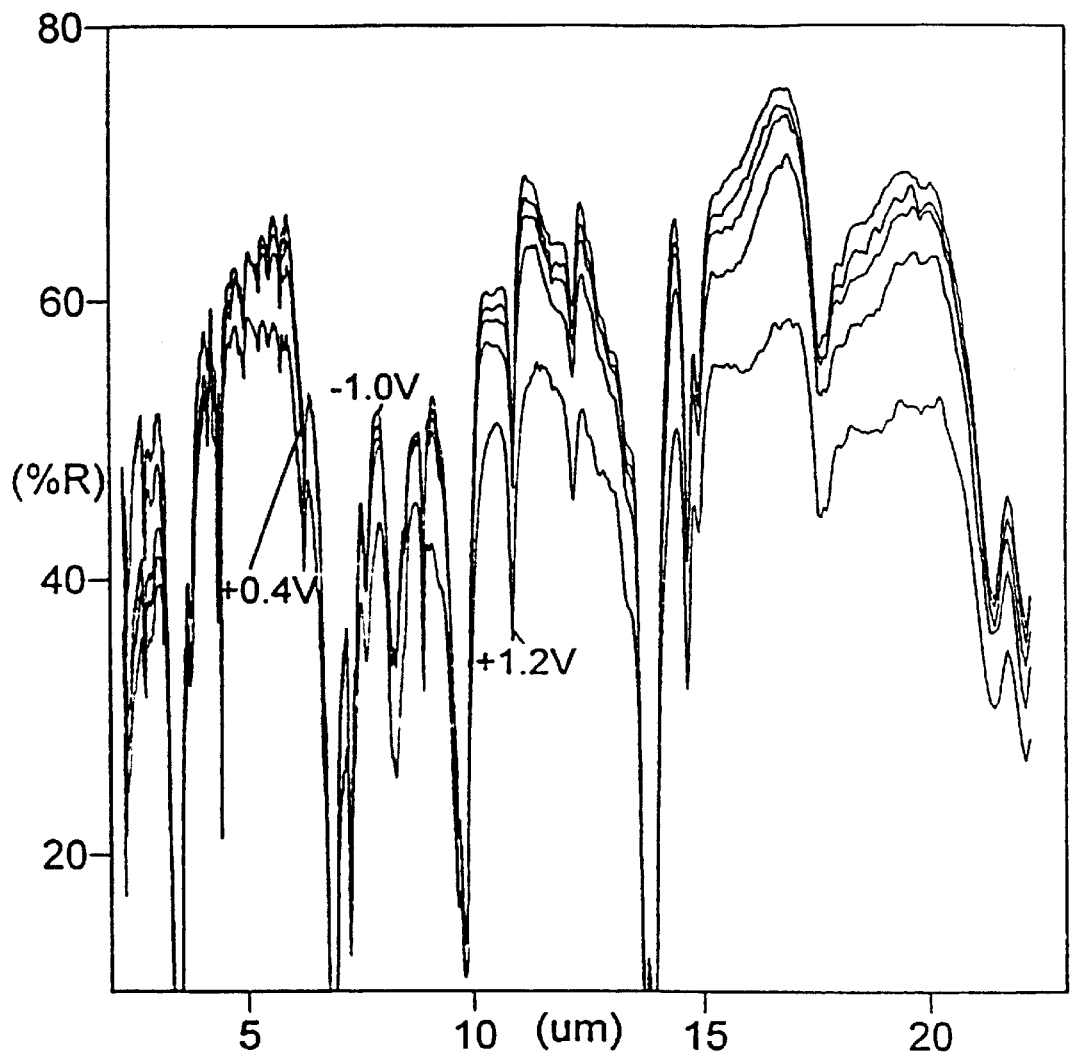
FIG. 37 is a specular FTIR spectrum of the electrochromic device of Example 13.

FIG. 37 is a specular FTIR spectrum of the device. The device exhibited large dynamic range in the long wave infrared region beyond 10 $\mu$M.

The present invention may be embodied in other specific forms without departing from the spirit or essential attributes thereof and, accordingly, reference should be made to the appended claims, rather than to the foregoing specification, as indicating the scope of the invention.

I claim:

1. A flexible electrochromic device comprising
   (a) a flexible outer layer;
   (b) an electrode comprising:
      (i) an electrochromic conducting polymer layer in contact with the flexible outer layer;
      (ii) an electrolyte-permeable substrate layer;
      (iii) a conductive reflective layer disposed between the substrate layer and the electrochromic conducting polymer layer;
   (c) one or more counter electrodes; and
   (d) an electrolyte in contact with said conductive reflective layer and said one or more counter electrodes.

2. An electrochromic device according to claim 1, wherein the conductive reflective layer is in the form of a grid.

3. An electrochromic device according to claim 1, wherein one or more counter electrodes comprise
   (a) a second conducting polymer layer; and
   (b) a second substrate layer in contact with said second conducting polymer layer.

4. An electrochromic device according to claim 1, wherein said electrochromic conducting polymer layer further comprises one or more dopants.

5. An electrochromic device according to claim 1, wherein the electrochromic conducting polymer of said electrochromic conducting polymer layer is selected from the group consisting of poly(aniline), poly(diphenyl amine), poly(4-amino biphenyl), poly(3-alkyl thiophene), poly (phenylene), poly(phenylene vinylene), poly(alkylene vinylenes), poly(amino quinolines), poly(diphenyl benzidine), and combinations thereof.

6. An electrochromic device according to claim 4, wherein said dopant is selected from the group consisting of poly(styrene sulfonate), poly(anethosulfonate), poly(vinyl sulfate), p-toluene sulfonate, trifluoromethane sulfonate, 3-hydroxy-42,7-naphthalenesulfonic acid, poly(vinyl stearate), and combinations thereof.

7. An electrochromic device according to claim 6, wherein the electrochromic conducting polymer of said electrochromic conducting polymer layer is poly(aniline) and said dopant is selected from the group consisting of poly(vinyl sulfate), poly(anethosulfonate), and combination thereof.

8. An electrochromic device according to claim 7, wherein said dopant is poly(vinyl sulfate).

9. An electrochromic device according to claim 1, wherein said outer layer comprises one or more polymer selected from the group consisting of poly(ethylene terephthalate), poly(ethylene), poly(propylene), poly (methyl methacrylate), poly(ethyl methacrylate), acrylonitrile methyl acrylate copolymers, ethylene vinyl acetate, fluorinated ethylenepropylene resins, fluorinated poly (alkylenes), poly(vinyl alcohol), poly(ethylene glycol), poly (vinyl chloride).

10. An electrochromic device according to claim 9, wherein said outer layer comprises poly(ethylene).

11. An electrochromic device according to claim 9, wherein said outer layer comprises poly(methyl methacrylate), poly(ethyl methacrylate) or mixture thereof.

12. An electrochromic device according to claim 1, wherein said electrolyte-permeable substrate layer contains pores having a pore size less than about 50 $\mu$m.

13. An electrochromic device according to claim 12, wherein said electrolyte-permeable substrate layer contains pores having a pore size from about 0.05 $\mu$m to about 20 $\mu$m.

14. The electrochromic device according to claim 1, wherein the electrolyte-permeable substrate layer comprises a material selected from the group consisting of poly (propylene), poly(ethylene terephthalate), poly (tetrafluoroethylene), poly(ethylene), nylon, poly (vinylidene fluoride), and combinations thereof.

15. The electrochromic device according to claim 1, wherein the conductive reflective layer is formed from a metal selected from the group consisting of Ir, Pt, Au, Rh, Cu, Ag, and Ni and combinations thereof.

16. An electrochromic polymeric matrix comprising:
   (a) one or more conducting polymers selected from the group consisting of poly(diphenyl amine), poly(4-amino biphenyl), poly(aniline), poly(3-alkyl thiophene), and poly(diphenyl benzidine); and
   (b) poly(anethosulfonate) as a dopant polymer.

17. An electrochromic polymeric matrix according to claim 16 wherein the conducting polymer is poly(aniline), and the composition comprises poly(vinyl sulfate) as a further dopant polymer.

18. An electrochromic device comprising
   (a) an electrode comprising an electrochromic material;
   (b) one or more counter electrodes; and
   (c) an aqueous electrolyte in contact with the electrochromic material and the one or more counter electrodes, which electrolyte comprises sulfuric acid, poly(vinyl sulfate) and poly(anethosulfonate).

19. An electrochromic device according to claim 18 wherein the electrolyte further comprises poly(vinyl alcohol).

20. An electrochromic device comprising
   (a) an electrode comprising an electrochromic material;
   (b) one or more counter electrodes; and
   (c) a nonaqueous electrolyte in contact with the electrochromic material and the one or more counter electrodes, which electrolyte comprises:
      (i) poly(ethylene oxide);
      (ii) poly(ethylene glycol);
      (iii) poly(anethosulfonate);
      (iv) poly(vinyl sulfate); and
      (v) one or more dopants selected from the group consisting of poly(anethosulfonate), p-toluene sulfonate, trifluoromethane sulfonate, poly(vinyl stearate), and poly(vinyl sulfate).

21. An electrochromic polymeric matrix comprising:
(a) one or more conducting polymers selected from the group consisting of poly(diphenyl amine), poly(4-amino biphenyl), poly(3-alkyl thiophene), and poly(diphenyl benzidine); and
(b) one or more dopant polymer selected from the group consisting of poly(anethosulfonate) and poly(vinylsulfate).

* * * * *

UNITED STATES PATENT AND TRADEMARK OFFICE
CERTIFICATE OF CORRECTION

PATENT NO.    : 5,995,273                                                      Page 1 of 1
DATED         : November 30, 1999
INVENTOR(S)   : Prasanna Chandrasekhar It is certified that error appears in the above-identified patent and that said Letters Patent is hereby corrected as shown below:

<u>Column 1,</u>
Line 2, insert the following:
-- Reference to Government Grant

This invention was made with partial (U.S.) Government support under Contract No. N00014-96-C-0229 awarded by the Department of the Navy. The Government has certain rights in the invention. --

Signed and Sealed this

Eleventh Day of February, 2003

JAMES E. ROGAN
*Director of the United States Patent and Trademark Office*